United States Patent
Furuya et al.

(10) Patent No.: US 7,692,848 B2
(45) Date of Patent: Apr. 6, 2010

(54) WAVELENGTH CONVERSION MODULE, LASER LIGHT SOURCE DEVICE, TWO-DIMENSIONAL IMAGE DISPLAY DEVICE, BACKLIGHT LIGHT SOURCE, LIQUID CRYSTAL DISPLAY DEVICE AND LASER PROCESSING DEVICE

(75) Inventors: Hiroyuki Furuya, Nara (JP); Kazuhisa Yamamoto, Osaka (JP); Kiminori Mizuuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 207 days.

(21) Appl. No.: 12/090,064

(22) PCT Filed: Oct. 11, 2006

(86) PCT No.: PCT/JP2006/320226

§ 371 (c)(1),
(2), (4) Date: Apr. 11, 2008

(87) PCT Pub. No.: WO2007/043560

PCT Pub. Date: Apr. 19, 2007

(65) Prior Publication Data

US 2009/0279017 A1    Nov. 12, 2009

(30) Foreign Application Priority Data

Oct. 12, 2005    (JP) ................ 2005-297459

(51) Int. Cl.
G02F 1/35    (2006.01)
G02F 2/02    (2006.01)

(52) U.S. Cl. ................ 359/328; 372/22; 359/332

(58) Field of Classification Search ......... 359/326–332; 372/5, 6, 21, 22; 385/122
See application file for complete search history.

(56) References Cited

U.S. PATENT DOCUMENTS 5,359,452 A     10/1994   Nitanda et al.
5,434,700 A *    7/1995   Yoo ........................... 359/332
6,927,895 B2 *   8/2005   Ju et al. ...................... 359/332

FOREIGN PATENT DOCUMENTS

JP    6-224507    8/1994

(Continued)

OTHER PUBLICATIONS

International Search Report issued Nov. 7, 2006 in the International (PCT) Application No. PCT/JP2006/320266.

(Continued)

Primary Examiner—Daniel Petkovsek
(74) Attorney, Agent, or Firm—Wenderoth, Lind & Ponack, L.L.P.

(57) ABSTRACT

A wavelength conversion module includes: a first fundamental wave propagation optical fiber for propagating a fundamental wave emitted from a laser light source; a first wavelength conversion element, optically connected to the first fundamental wave propagation optical fiber, for converting the fundamental wave emitted from the first fundamental wave propagation optical fiber into a harmonic wave; and a first harmonic propagation optical fiber, optically connected to the first wavelength conversion element, for propagating the harmonic wave emitted from the first wavelength conversion element, wherein the core diameter of the first harmonic propagation optical fiber is 0.5 to 0.9 times as large as the core diameter of first fundamental wave propagation optical fiber.

21 Claims, 15 Drawing Sheets

FOREIGN PATENT DOCUMENTS

| | | |
|---|---|---|
| JP | 6-265952 | 9/1994 |
| JP | 11-271823 | 10/1999 |
| JP | 2001-125157 | 5/2001 |
| JP | 3261594 | 12/2001 |
| JP | 3424125 | 5/2003 |
| JP | 2004-20588 | 1/2004 |
| JP | 2005-202334 | 7/2005 |

OTHER PUBLICATIONS

D. H. Jundt et al., "Periodically poled $LiNbO_3$ for high-efficiency second-harmonic generation", Applied Physics letters, 59, 21, 2657-2659 (1991).

K. Mizuuchi et al., "3-W cw green generation at 34% efficiency by single-pass frequency-doubling in a bulk periodically poled $MgO:LiNbO_3$ at room temperature", Conference on Lasers and Electro-Optics 2005 (CLEO2005), Technical digest, CFL-1 (2005).

* cited by examiner

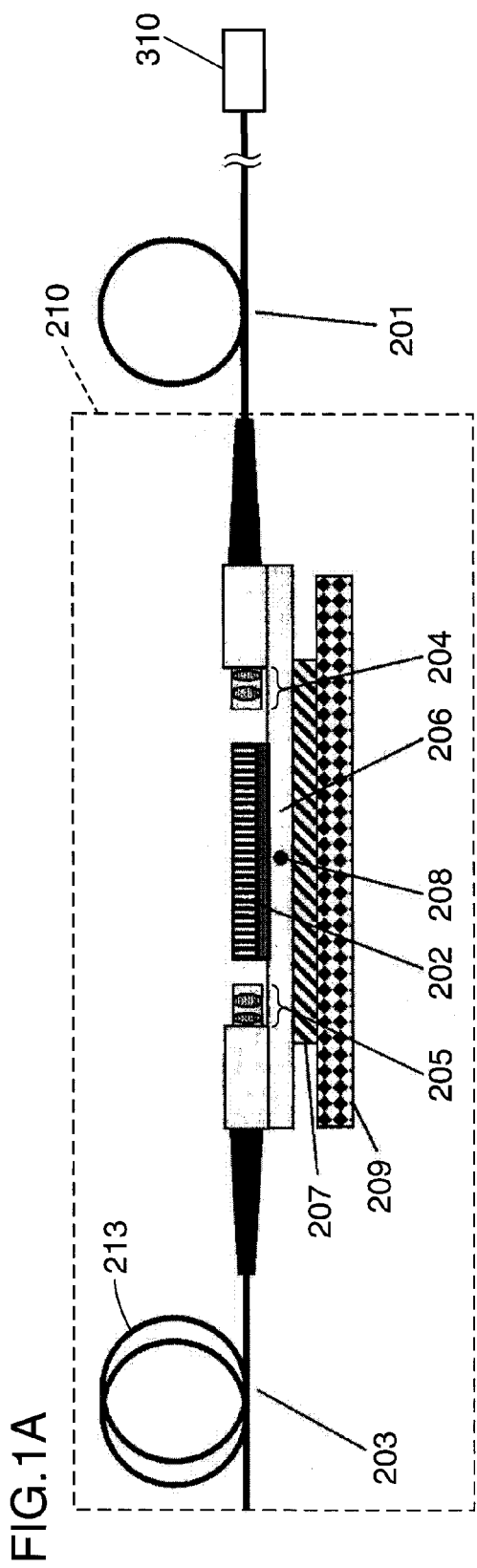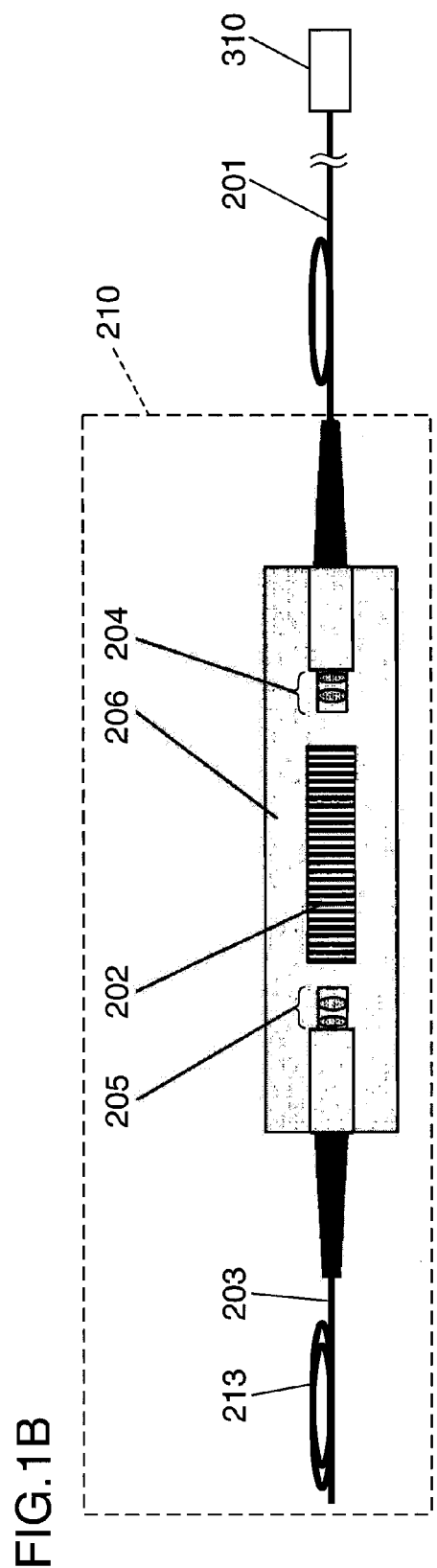

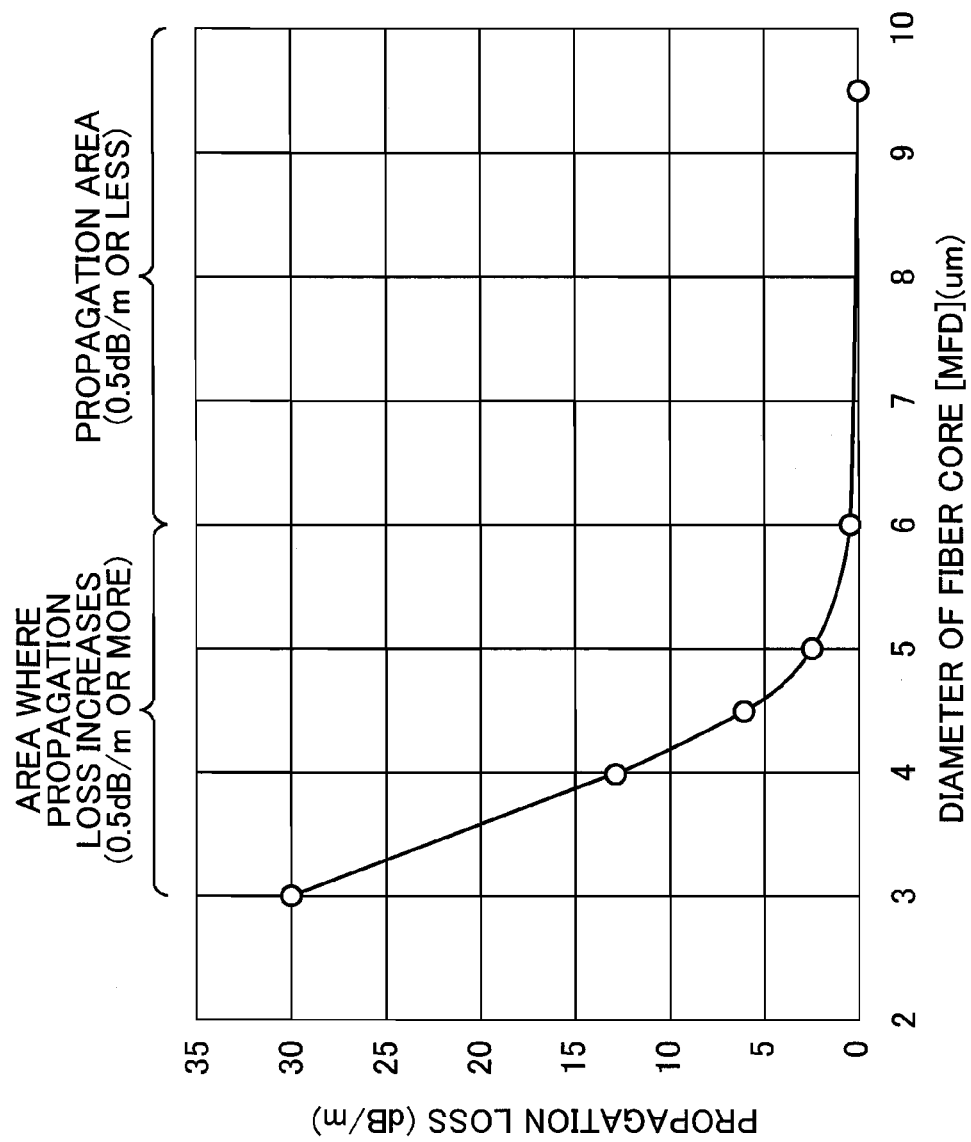

WAVELENGTH CONVERSION MODULE, LASER LIGHT SOURCE DEVICE, TWO-DIMENSIONAL IMAGE DISPLAY DEVICE, BACKLIGHT LIGHT SOURCE, LIQUID CRYSTAL DISPLAY DEVICE AND LASER PROCESSING DEVICE

TECHNICAL FIELD

The present invention relates to a wavelength conversion module incorporated with a nonlinear optical element (wavelength conversion element) to be used in optical wavelength conversion, as well as a laser light source device, a two-dimensional image display device, a backlight light source, a liquid crystal display device, and a laser processing device incorporated with the module.

BACKGROUND ART

A high-output laser light source has been drawn attention as a light source to be used in a laser processing device, a laser display, or a like device.

A solid-state laser such as a YAG laser, a fiber laser using a fiber doped with a rare earth component such as Yb or Nd, or a like has been developed as a high-output laser light source for emitting laser beams in an infrared region. Meanwhile, a semiconductor laser using gallium arsenic, gallium nitride, or a like has also been developed as a high-output laser light source for emitting laser beams in red and blue regions. In a current technology, it is still difficult to emit green laser beams directly from a semiconductor, as high-output laser beams in a green region. In view of this, generally, high-output laser beams in a green region are emitted by subjecting laser beams in an infrared region, which are emitted from a solid-state laser such as a YAG laser, or a fiber laser, to wavelength conversion by a nonlinear optical element.

As examples of the nonlinear optical element, there have been developed elements (nonlinear optical elements) made of a nonlinear optical single crystal such as lithium niobate ($LiNbO_3$), lithium tantalite ($LiTaO_3$), lithium triborate ($LiB_3O_5$:LBO), β-barium borate (β-$BaB_2O_4$), titanyl potassium phosphate ($KTiOPO_4$:KTP), or cesium lithium borate ($C_8LiB_6O_{10}$:CLBO).

For instance, the following nonlinear optical element is used in a device for obtaining a laser output in a green region.

A quasi phase matching (QPM) wavelength conversion element made of a lithium niobate crystal having a polarization reversed structure is preferably used in a device capable of obtaining laser beams of 200 to 300 mW-class in a green region in the aspect of obtaining high conversion efficiency by a large nonlinear optical constant.

A nonlinear optical single crystal such as LBO or KTP is used in a device capable of obtaining high-output laser beams of several-watt-class in a green region.

The LBO crystal, however, has a small nonlinear optical constant. Accordingly, it is necessary to construct a resonator to obtain high conversion efficiency, and mount the LBO crystal in the resonator. This may make the configuration of the laser device complicated, and require fine adjustment on alignment.

As compared with the LBO crystal, the KTP crystal has a larger nonlinear optical constant. Accordingly, the KTP crystal is advantageous in obtaining high conversion efficiency without constructing a resonator. However, the KTP crystal has a disadvantage that the crystal is easy to be broken or degraded by a fundamental wave or a generated second harmonic wave.

In, addition, in lithium niobate or lithium tantalite, there are reported that a change in refractive index (photo refractive) by light, i.e. light damage, which is a phenomenon of crystal degradation, is suppressed by introducing an additive to the crystal, as recited in patent document 1, or by growing the crystal by a method capable of approximating the crystal composition close to an idealistic composition (stoichiometric composition).

In addition to the above, non-patent document 1 has reported an approach of generating 1.7 W green laser beams, as high-output laser beams in a green region, by heating an $LiNbO_3$ crystal doped with 5 mol magnesium oxide to 140° C. Also, in recent years, non-patent document 2 has reported an approach of generating 3 W green laser beams by combining a wavelength conversion element made of a crystal substrate of an $LiNbO_3$ single crystal doped with magnesium oxide subjected to periodical polarization reversal, with a fiber laser capable of narrowing the wavelength bandwidth of an oscillation wavelength.

In the following, an arrangement of a conventional wavelength conversion device incorporated with a nonlinear optical element is described referring to FIG. 14.

In the wavelength conversion device shown in FIG. 14, laser beams generated in a fundamental wave light source 101 propagate in the air, and are concentrated on a condenser lens 102, and incident into a wavelength conversion element 103. Then, a part of the fundamental wave incident into the wavelength conversion element 103 is subjected to wavelength conversion by the wavelength conversion element 103. A generated harmonic wave and the remaining fundamental wave are collimated into parallel beams by a re-collimator lens 104, and then separated into a harmonic 106 and a remaining fundamental wave 107 by a beam splitter 105. And, the remaining fundamental wave having a high-energy separated by the beam splitter 105 is wasted by a beam dumper 108.

As described above, the KTP crystal or the LBO crystal has the drawback that the crystal may be damaged or degraded by a second harmonic wave. In order to suppress the drawback, there is proposed an approach of suppressing crystal degradation, in which wavelength conversion is performed by using multiple wavelength conversion elements to lower the power density of a fundamental harmonic to be incident into each of the wavelength conversion elements (see e.g. patent document 3).

In the following, a wavelength conversion device incorporated with multiple wavelength conversion elements recited in patent document 3 is described referring to FIG. 15.

As shown in FIG. 15, a fundamental wave emitted from a fundamental wave light source 101 is concentrated by a condenser lens 102a, and then incident into a first wavelength conversion element 103a. After the wavelength of the fundamental wave is converted by the first wavelength conversion element 103a, the fundamental wave is collimated into a parallel beam by a collimator lens 104a. And, a harmonic wave 106a is separated by a beam splitter 105a. A remaining fundamental wave separated by the beam splitter 105a is concentrated by a condenser lens 102b, and then incident into a second wavelength conversion element 103b. After the wavelength conversion by the second wavelength conversion element 103b, the remaining fundamental wave is collimated into a parallel beam by a collimator lens 104b, and then separated into a harmonic wave 106b and a remaining fundamental wave 107 by a beam splitter 105b. Then, the remaining fundamental wave 107 is absorbed and diffused by a heat sink 108.

In the case where a 3 W harmonic wave is obtained by projecting a fundamental wave of e.g. 8 to 9 W to the conventional wavelength conversion device as shown in FIG. 15, a fundamental wave of 5 to 6 W is outputted as a remaining fundamental wave. The remaining fundamental wave is high-energy laser beam to be outputted as a parallel beam. In order to absorb and diffuse such a high-energy remaining fundamental wave, heat releasing means such as a large-sized beam dumper, a heat-releasing fin, or a heat sink has been required. Further, the above wavelength conversion device is a relatively large size because of requiring an arrangement of an optical component such as a lens or a beam splitter control at a predetermined position in a state such that beams run around in a free space.

Furthermore, although the aforementioned conventional wavelength conversion device may be usable in a large-sized apparatus such as a laser processing device, it is difficult to incorporate in a compact consumer product such as a laser display, which is proposed as a novel application of laser.

In a wavelength conversion device, a laser light source may be miniaturized by narrowing a wavelength band of a fundamental wave suitable for wavelength conversion, with use of a fiber laser. However, it is required to arrange a wavelength conversion element and various optical components in the similar manner as in the conventional arrangement. Accordingly, it is difficult to miniaturize the entirety of the wavelength conversion device even with use of a fiber laser.

Patent document 1: Japanese Patent No. 3,261,594

Patent document 2: Japanese Patent No. 3,424,125

Patent document 3: Japanese Unexamined Patent Publication No. Hei 11-271823

Non-patent document 1: Applied Physics letters, 59, 21, 2657-2659 (1991)

Non-patent document 2: Conference on Lasers and Electro-Optics 2005 (CLEO2005), Technical digest, CFL-1 (2005)

DISCLOSURE OF THE INVENTION

An object of the present invention is to provide a miniaturized wavelength conversion module that enables to waste a remaining fundamental wave generated in a wavelength conversion without providing large-sized heat releasing means, in the case obtaining a high-energy harmonic wave by converting a wavelength of fundamental wave by a wavelength conversion element.

A wavelength conversion module according to an aspect of the invention comprises: a first fundamental wave propagation optical fiber for propagating a fundamental wave emitted from a laser light source; a first wavelength conversion element, optically connected to the first fundamental wave propagation optical fiber, for converting the fundamental wave to be exited from the first fundamental wave propagation optical fiber into a harmonic wave; and a first harmonic propagation optical fiber, optically connected to the first wavelength conversion element, for propagating the harmonic wave exited from the first wavelength conversion element, wherein the first harmonic propagation optical fiber has a core diameter smaller than a core diameter of the first fundamental wave propagation optical fiber.

A laser light source device according to another aspect of the invention comprises the aforementioned wavelength conversion module, wherein the wavelength conversion module is operative to output laser beams of 2 W or more in average output and 200 to 800 nm in wavelength range.

A two-dimensional image display device according to yet another aspect of the invention comprises the aforementioned laser light source device, wherein the two-dimensional image display device is operative to display an image by using the laser beams of 2 W or more in average output to be emitted from the laser light source device.

A backlight light source according to yet another aspect of the invention comprises the aforementioned laser light source device, wherein the backlight light source is operative to illuminate a liquid crystal display portion by using the laser beams of 2 W or more in average output to be emitted from the laser light source device.

A liquid crystal display device according to yet another aspect of the invention comprises the aforementioned backlight light source.

A laser processing device according to still another aspect of the invention comprises the aforementioned laser light source device, wherein the laser processing device is operative to process an object to be processed by using the laser light of 2 W or more in average output to be emitted from the laser light source device.

These and other objects, and novel features of the present invention will become more apparent upon reading the following detailed description along with the accompanying drawings.

BRIEF DESCRIPTION OF THE DRAWINGS

FIG. 1A is a side view of a wavelength conversion module as a first embodiment of the invention.

FIG. 1B is a top plan view of the wavelength conversion module as the first embodiment of the invention.

FIG. 2 is a graph showing relations between a propagation loss of a fundamental wave of 1,064 nm wavelength, and a core diameter of an optical fiber.

BEST MODE FOR CARRYING OUT THE INVENTION

First Embodiment

Figure 3:
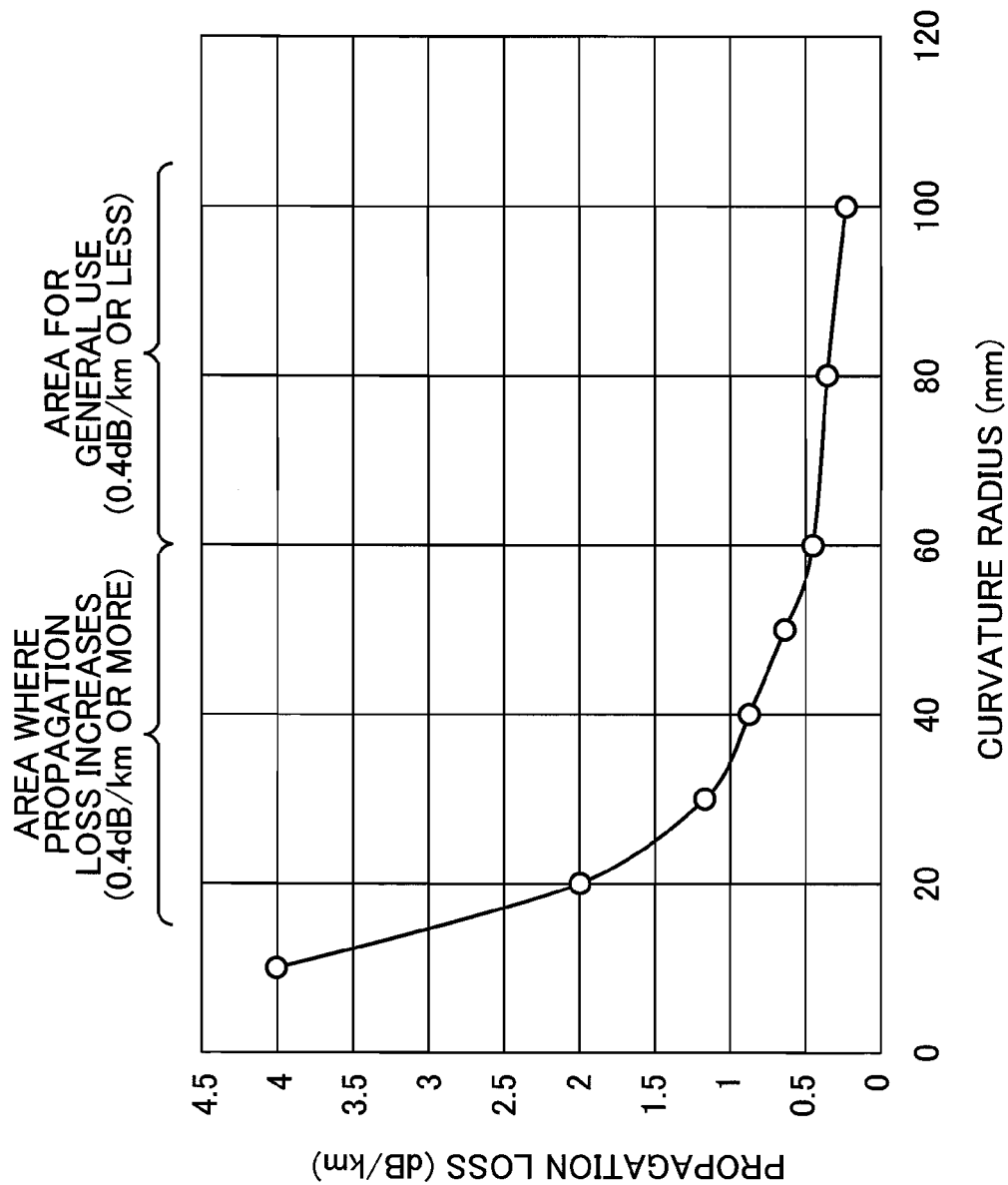
FIG. 3 is a graph showing relations between a propagation loss of a fundamental wave of 1,064 nm wavelength, and a curvature radius of a curved portion of an optical fiber.

A wavelength conversion module 210 as the first embodiment of the invention is described referring to FIGS. 1A and 1B. FIG. 1A is a side view of the wavelength conversion module 210 as the first embodiment of the invention. FIG. 1B is a top plan view of the wavelength conversion module 210.

Referring to FIGS. 1A and 1B, the reference numeral 201 shows a first fundamental wave propagation optical fiber, 202 shows a first wavelength conversion element, 203 shows a first harmonic propagation optical fiber, 204 shows an incident side coupling lens unit, 205 shows an exit side coupling lens unit, 206 shows a base member, 207 shows a peltier element, 208 shows a temperature sensor, 209 shows a heat sink, and 310 shows a laser light source. The first harmonic propagation optical fiber 203 includes a curved portion 213 obtained by forming a fiber into a coil.

The first fundamental wave propagation optical fiber 201 and the incident side coupling lens unit 204 are aligned to each other on the base member 206 in such a manner that a fundamental wave exiting from the first fundamental wave propagation optical fiber 201 is concentrated on the incident side coupling lens unit 204 for incidence into the first wavelength conversion element 202. Similarly, the first harmonic propagation optical fiber 203 and the exit side coupling lens unit 105 are aligned to each other on the base member 206 in such a manner that a harmonic wave and a remaining fundamental wave exiting from the first wavelength conversion element 202 are coupled by the exit side coupling lens unit 205 for incidence into the first harmonic propagation optical fiber 203.

An operation of the wavelength conversion module 210 is described in the following.

A fundamental wave emitted from the laser light source 310 is incident into the first fundamental propagation optical fiber 201 and propagated through the first fundamental propagation optical fiber 201. Then, after exiting from the first fundamental propagation optical fiber 201, the fundamental wave is concentrated on the incident side coupling lens 204 for incidence into the first wavelength conversion element 202. Preferably, the temperature of the first wavelength conversion element 202 is controlled by the temperature sensor 208 and the peltier element 207 with precision corresponding to about 0.01° C. order in view of the point that a phase matching wavelength changes depending on the temperature of a crystal. In the wavelength conversion module 210, a temperature variation is suppressed by providing the heat sink 209.

A part of the fundamental wave incident into the first wavelength conversion element 202 is subjected to wavelength conversion into a harmonic wave. After exiting from the first wavelength conversion element 202, the remaining fundamental wave which has not undergone the wavelength conversion and the harmonic wave are converged on the exit side coupling lens unit 205 and enter into the first harmonic propagation optical fiber 203. The harmonic wave incident into the first harmonic propagation optical fiber 203 propagates through the first harmonic propagation optical fiber 203 at a single mode. The core diameter of the first harmonic propagation optical fiber 203 is smaller than the core diameter of the first fundamental propagation optical fiber 201. Accordingly, the remaining fundamental wave is lost during propagation through the first harmonic propagation optical fiber 203, and an energy corresponding to the propagation loss is released from the surface of the first harmonic propagation optical fiber 203 as a heat. Specifically, the core diameter of the first harmonic propagation optical fiber 203 is set smaller than the core diameter of the first fundamental wave propagation optical fiber 201 to set a cutoff wavelength of the first harmonic propagation optical fiber 203 smaller than the wavelength of the remaining fundamental wave exiting from the first wavelength conversion element 202. Thus, the power of the remaining fundamental wave can be reduced by increasing the energy loss of the remaining fundamental wave in the first harmonic propagation optical fiber 203.

The first fundamental wave propagation optical fiber 201 is preferably a polarization maintaining single mode fiber such as a PANDA fiber or a bow-tie fiber, in place of a general single mode fiber because a beam needs to be a linearly polarized beam along a predetermined crystal axis when enters into the first wavelength conversion element 202.

A general single mode fiber or a polarization maintaining fiber is used as the first harmonic propagation optical fiber 203 depending on purpose of use.

FIG. 2 shows relations between a propagation loss of a fundamental wave of 1,064 nm wavelength in a single mode optical fiber, and a core diameter of the single mode optical fiber, as an example of an experiment result conducted by the inventors.

As shown in FIG. 2, the propagation loss of a fundamental wave of 1,064 nm wavelength is 0.5 dB/m or less in an optical fiber of 6 μm core diameter, which is optimal to propagate the fundamental wave of 1,064 nm wavelength at a single mode. FIG. 2 also shows that the propagation loss is about 2 to 3 dB/m in an optical fiber of 5.4 μm core diameter, which is about 0.9 times as large as the 6 μm-core diameter; and the propagation loss is 30 dB/m in an optical fiber of 3 μm core diameter, which is 0.5 times as large as the 6 μm-core diameter. The result shows that a propagation loss significantly increases in case of an optical fiber having a core diameter of 0.9 times or less to the 6 μm-core diameter, which is optimal to propagate a fundamental wave of 1,064 nm wavelength at a single mode.

The above result shows that the energy of the remaining fundamental wave obtaining by wavelength conversion can be significantly lost in the first harmonic propagation optical fiber 203 by setting the core diameter of the first harmonic propagation optical fiber 203 to 0.9 times or less, more preferably less than 0.8 times to the core diameter of the first fundamental wave propagation optical fiber 201. Also, it is preferable to set the core diameter of the first harmonic propagation optical fiber 203 to 0.5 times or more to the core diameter of the first fundamental wave propagation optical fiber 201 in the aspect of sufficiently decreasing the loss of a harmonic wave.

Meanwhile, the inventors investigated a means for increasing an energy loss effect of a remaining fundamental wave by the first harmonic propagation optical fiber 203 in the wavelength conversion module 210, and found that the energy loss of a remaining fundamental wave can be significantly increased by forming the curved portion 213 having a curvature radius equal to or smaller than a predetermined curvature radius at a predetermined site of the first harmonic propagation optical fiber 203.

FIG. 3 shows relations between a propagation loss of a fundamental wave of 1,064 nm wavelength, and a curvature radius of a coil portion of an optical fiber, in the case where the coil portion is formed on a single mode fiber of 5 µm core diameter, as an example of the experiment result.

As shown in FIG. 3, in the case where the curvature radius is over 60 mm, the propagation loss of a fundamental wave of 1,064 nm wavelength is 0.4 dB/km or less. In the case where the curvature radius is 60 mm or less, the propagation loss sharply increases. In the case where the curvature radius is 10 mm, the propagation loss is 4 dB/km.

The experiment result in FIG. 3 shows that the propagation loss of a fundamental wave is increased by setting the curvature radius to 60 mm or less to thereby effectively waste a fundamental wave. In the case where the curvature radius is 60 mm or less, the propagation loss of a harmonic is as small as 0.4 dB/km or less, although the propagation loss of a fundamental wave is considerably increased. The smaller the curvature radius is, the larger the propagation loss of a fundamental wave is. However, if the curvature radius is 10 mm or less, it is difficult to bend the optical fiber, and the optical fiber may be damaged or broken during bending.

Figure 4A:
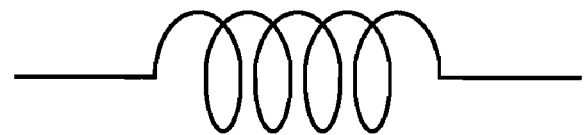
FIG. 4A is a diagram showing an example of a coil configuration of a curved portion of an optical fiber.
Figure 4B:
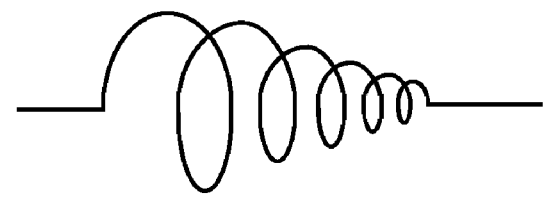
FIG. 4B is a diagram showing an example of a helical-coil configuration of the curved portion of the optical fiber.
Figure 4C:
FIG. 4C is a diagram showing an example of a wave-like configuration of the curved portion of the optical fiber.
Figure 4D:
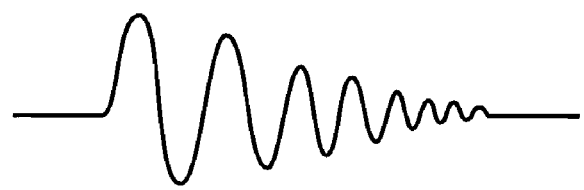
FIG. 4D is a diagram showing an example of a wave-like configuration of the curved portion of the optical fiber.

The shape of the curved portion 213 may include a coil configuration having a feature that individual annular portions have substantially an identical curvature radius as shown in FIG. 4A, and a helical-coil configuration having a feature that the curvature radius of individual annular portions is gradually decreased as shown in FIG. 4B. Alternatively, the curved portion may have a wave-like configuration having a feature that individual waves have substantially an identical height as shown in FIG. 4C, or a wave-like configuration having a feature that the height of individual waves is gradually decreased as shown in FIG. 4D.

As shown in FIG. 4B, in the case where the curved portion has the helical-coil configuration having a feature that the curvature radius of the individual annular portions is gradually decreased, it is preferable to set the curvature radius of the curved portion in an incident side larger than the curvature radius of the curved portion in an exit side. As shown in FIG. 4D, in the case where the curved portion has the wave-like configuration having a feature that the height of the individual waves is gradually decreased, it is preferable to set the height of the wave of the curved portion in an incident side larger than the height of the wave of the curved portion in an exit side. The light energy is gradually decreased, as the light propagates from the incident portion toward the exit portion. Accordingly, the releasing heat amount can be made uniform with respect to the entirety of the optical fiber by decreasing the releasing heat amount on a low energy portion by decreasing the propagation loss thereat, and by increasing the heat releasing rate on a high energy portion by increasing the propagation loss thereat.

It is preferable to locate the curved portion 213 at a site where the heat is efficiently released, in the case where the wavelength conversion module 210 is incorporated in a laser processing device, a laser display, or a like device. Specific examples on the preferred location will be described in the sixth embodiment.

Examples of the wavelength conversion element 202 are elements made of lithium niobate, lithium tantalate, magnesium oxide doped lithium niobate, magnesium oxide doped lithium tantalate, titanyl potassium phosphate, lithium triborate, potassium niobate, potassium tantalate, or a like component having a stoichiometric composition and a congruent composition. Particularly preferably, the wavelength conversion element 202 has a periodically reversed polarization structure.

It is preferable to set the molar concentration of magnesium oxide in the range from 5 to 6.3 mol %, and more preferably from 5.3 to 6.3 mol % with respect to a magnesium oxide doped lithium niobate element or a magnesium oxide doped lithium niobate crystal element having a stoichiometric composition and a congruent composition. Specifically, it is desirable to add magnesium oxide in the range of 5 mol % or more, and more preferably in the range from 5.3 mol % or more to 6.3 mol % or less in order to suppress light damage corresponding to a change in refractive index by light, or crystal degradation.

In the case where a fundamental wave is generated from a continuous wave (CW) laser light source, particularly preferred is a magnesium oxide doped lithium niobate element having a periodically reversed polarization structure, because the magnesium oxide doped lithium niobate element has a large nonlinear optical constant and superior wavelength conversion efficiency.

In the case where a fundamental wave is generated by a pulse oscillation laser light source, preferably used are a magnesium oxide doped lithium niobate (Periodically Poled Mg:LiNbO$_3$:PPMgLN) element having a polarization reversed structure, titanyl potassium phosphate (Periodically Poled Mg:LiNbO$_3$:PPKTP) having a polarization reversed structure, magnesium doped lithium tantalate (Periodically Poled Mg:LiTaO$_3$:PPMgLT) having a polarization reversed structure, and a like component.

Examples of the base member 206 are a metallic substrate made of aluminum, brass, or a like material; and a ceramic substrate such as a negative thermal expansion ceramic substrate. Particularly, in the case where a harmonic of 2 W or more is generated by using the wavelength conversion module 210, it is preferable to use a negative thermal expansion ceramic substrate in order to suppress phase unmatching resulting from an exothermic operation of a crystal, and relax precision requirement on temperature adjustment. The thermal expansion coefficient of the negative thermal expansion ceramic substrate is preferably in the range from $-1\times10^7$ to 0.

Alternatively, the base member 206 may be a substrate whose thermal expansion is controlled by laminating substrates of materials having different thermal expansion coefficients to the thickness direction of the base member to suppress the aforementioned phase unmatching.

In the wavelength conversion module 210, the energy of the remaining fundamental wave is dispersed and released as a heat from a surface of the harmonic propagation optical fiber 203 during propagation therethrough. This is advantageous in avoiding energy localization, which may occur in the conventional wavelength conversion device at the time of exiting a remaining fundamental wave as parallel beams. In the result, there is no need of providing heat-releasing means such as a large-sized beam dumper, as required in the conventional wavelength conversion device.

High-output laser beams of 2 W or more in average output having 200 to 800 nm in wavelength range can be obtained by subjecting a fundamental wave of e.g. 700 to 1,600 nm in wavelength range to wavelength conversion by the aforementioned wavelength conversion module 210.

Second Embodiment

Figure 5:
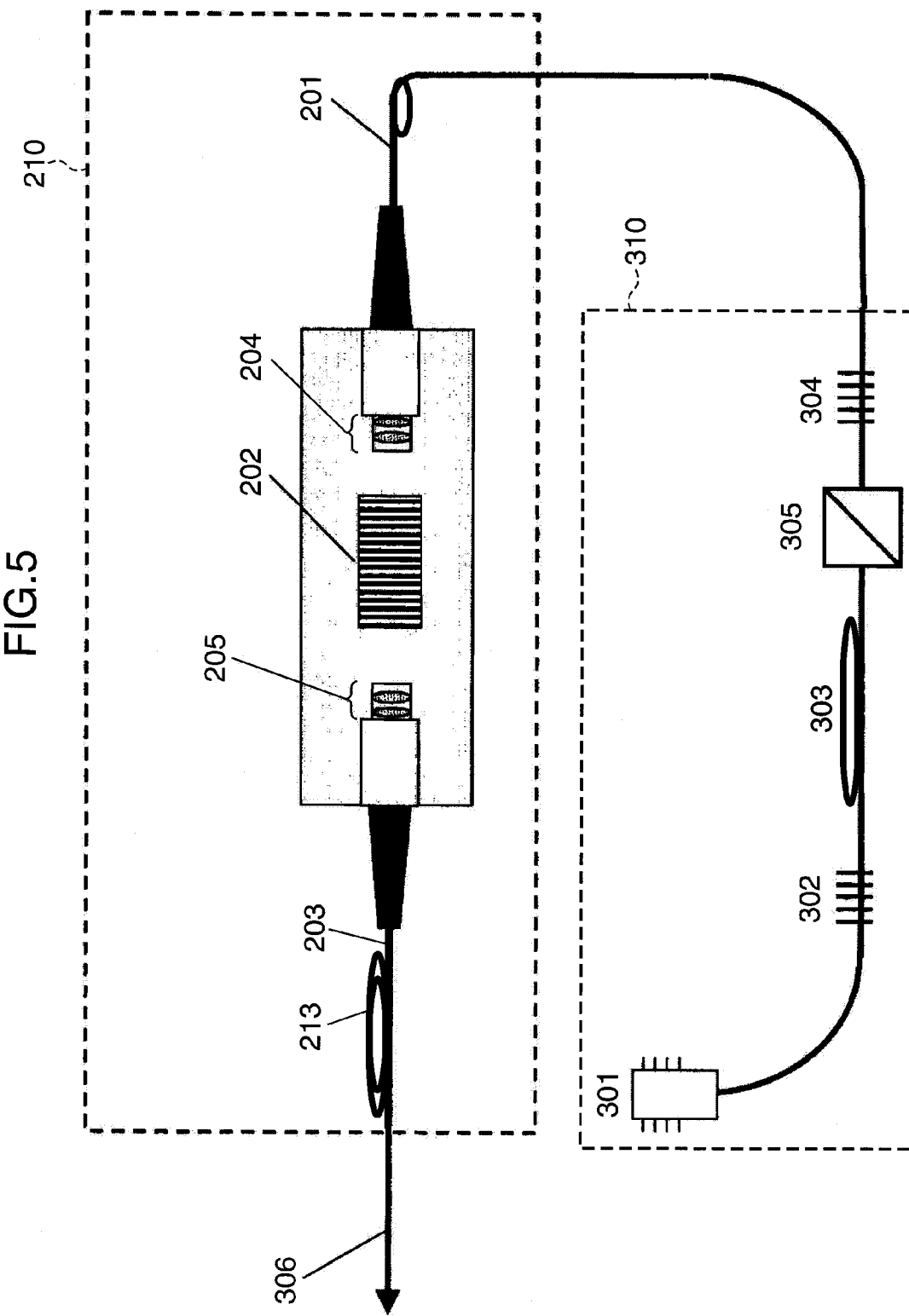
FIG. 5 is a diagram showing an arrangement of a laser light source device as a second embodiment of the invention.

A laser light source device incorporated with the wavelength conversion module 210 of the first embodiment is described in detail referring to FIG. 5.

FIG. 5 is a diagram showing an example of an arrangement of the laser light source device incorporated with the wavelength conversion module 210.

Referring to FIG. 5, the reference numeral 310 shows a laser light source to be used in this embodiment, 301 shows a laser diode (LD) light source for excitation (pumping), 303 shows a Yb-doped double clad fiber, 302 and 304 each shows a fiber grating, and 305 shows a polarizer for converting oscillation laser beams into linearly polarization beams. The fiber gratings 302 and 304 constitute a resonator. The fiber grating 304 has a center reflection wavelength of 1,064 nm and a reflection bandwidth of 0.09 nm to regulate the bandwidth of the oscillation laser beam and coincide with 0.1 nm, which is an allowable wavelength bandwidth of a wavelength conversion element having a polarization reversed structure. The Yb-doped double clad fiber 303 is excited by the excitation LD 301 (wavelength: about 195 nm, maximum output: 30 w), and generates a fundamental wave of a wavelength in the vicinity of 1,064 nm. The laser light source 310 described above generates continuous oscillation beams (CW) of 7 W in average output with a wavelength in the vicinity of 1,064 nm and 0.09 nm in wavelength bandwidth.

In this embodiment, a 4 μm core-125 μm clad single mode fiber of 10 m length is used as a first harmonic propagation optical fiber 203 to propagate green laser beams as a harmonic wave at a lowest order mode (single mode), a polarization maintaining single mode fiber such as a PANDA having 6 μm core-125 μm clad is used as a first fundamental wave propagation optical fiber 201. In this case, as compared with a propagation loss of green laser beams as a second harmonic wave (wavelength in the vicinity from 520 to 550 nm) which propagates through the first harmonic propagation optical fiber 203, a propagation loss of a fundamental wave (wavelength in the vicinity of 1,040 to 1,100 mm) whose wavelength is double the wavelength of the second harmonic is significantly increased.

A wavelength conversion element made of a MgO: LiNBO$_3$ crystal having a periodically reversed polarization structure with 10 mm length is used as a first wavelength conversion element 202. Conventionally, it has been a general practice to heat the wavelength conversion element to 100° C. or more in order to obtain a watt-class output. On the other hand, in the case where a wavelength conversion element made of a MgO:LiNBO$_3$ crystal having a periodically reversed polarization structure is used, a stabilized green laser output can be obtained even in a room temperature around 20 to 40° C. This is advantageous in reducing a consumption electric power of the device. In the case where the temperature for retaining a crystal structure is set to a room temperature or higher than the room temperature (40 to 60° C.), the parts cost can be reduced because a heater is usable in place of an expensive peltier element. Preferably, the temperature of the first wavelength conversion element 202 is controlled with precision corresponding to 0.01° C. order in view of the point that a phase matching wavelength changes depending on the temperature of a crystal.

A fundamental wave which exits from the Yb-doped double clad fiber 303 and passes through the fiber grating 304 propagates through the first fundamental wave propagation optical fiber 201 e.g. a PANDA type polarization maintaining fiber. Thereafter, the fundamental wave exiting from the first fundamental wave propagation optical fiber 201 is concentrated by an incident side coupling lens 204 and enters into the first wavelength conversion element 202.

Then, a part of the fundamental wave incident into the first wavelength conversion element 202 is converted into green laser beams of 532 nm wavelength (a second harmonic wave) which is one-half of the wavelength of the fundamental wave, and the remaining part of the fundamental wave serves as a remaining fundamental wave.

The generated green beam and the remaining fundamental wave exit from the first wavelength conversion element 202, and then are converged on an exit lens unit 205 for incidence into the first harmonic propagation optical fiber 203. The energy of the remaining fundamental wave is converted into a heat during propagation through the first harmonic propagation optical fiber 203. During the propagation, the energy of the second harmonic wave 306 is hardly lost.

In the laser light source device of the second embodiment, a second harmonic of 2 to 4 W is obtained by supplying a fundamental wave of e.g. 6 to 9 W.

Third Embodiment

Figure 6A:
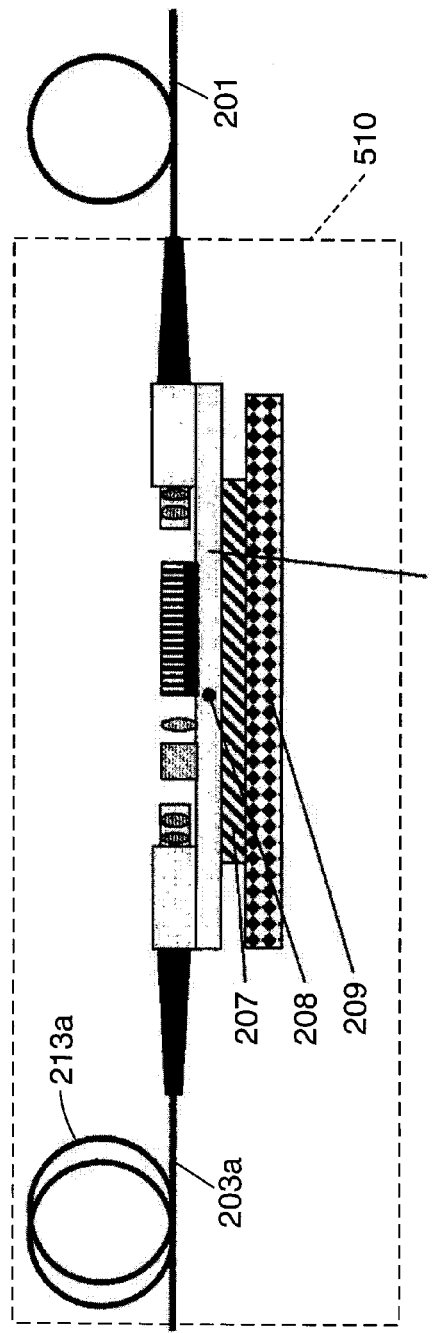
FIG. 6A is a side view of a wavelength conversion module provided with multiple wavelength conversion elements on a base member, as a third embodiment of the invention.
Figure 6B:
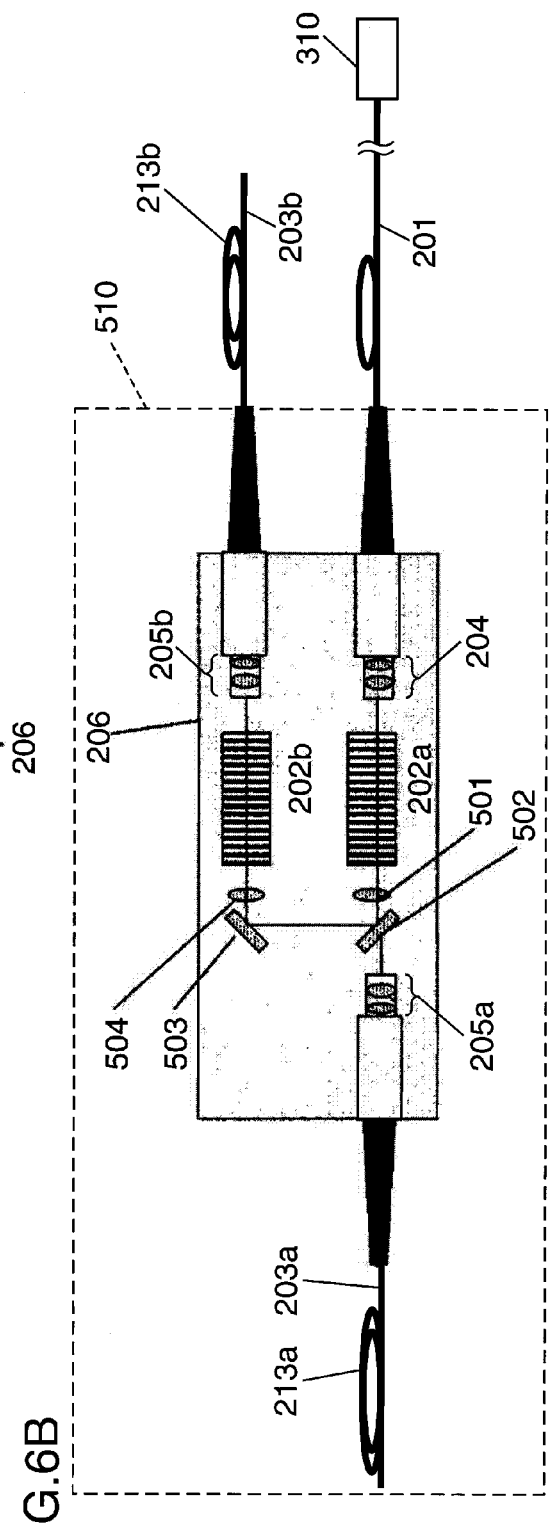
FIG. 6B is a top plan view of the wavelength conversion module provided with the multiple wavelength conversion elements on the base member, as the third embodiment of the invention.

In the third embodiment, a wavelength conversion module 510 incorporated with multiple wavelength conversion elements is described referring to FIGS. 6A and 6B. FIG. 6A is a side view of the wavelength conversion module 510. FIG. 6B is a top plan view of the wavelength conversion module 510. Constituent elements in the third embodiment with the same reference numerals as in the first and the second embodiments are identical or equivalent to those in the first and the second embodiments, and accordingly, detailed description thereof is omitted herein.

Referring to FIGS. 6A and 6B, the reference numeral 202a shows a first wavelength conversion element, 202b shows a second wavelength conversion element, 201 shows a first fundamental wave propagation optical fiber, 203a shows a first harmonic propagation optical fiber, 203b shows a second harmonic propagation optical fiber, 204 shows a first incident side coupling lens unit, 501 shows a re-collimator lens, 502 shows a beam splitter, 503 shows a mirror, 504 shows a second incident side coupling lens unit, 205a shows a first exit side coupling lens unit, 205b shows a second exit side coupling lens unit, 206 shows a base member, 207 shows a peltier element, 208 shows a temperature sensor, 209 shows a heat sink, and 310 shows a laser light source. The harmonic propagation optical fibers 203a and 203b respectively include curved portions 213a and 213b obtained by forming a fiber into a coil.

In the wavelength conversion module 510, a fundamental wave emitted from the laser light source 310 propagates through the first fundamental wave propagation optical fiber 201, and is concentrated by the first incident side coupling lens unit 204 for incidence into the first wavelength conversion element 202a. A part of the fundamental wave incident into the first wavelength conversion element 202a is subjected to wavelength conversion into a harmonic wave.

The harmonic wave, and the remaining fundamental wave which has not undergone the wavelength conversion are collimated into parallel beams by the re-collimator lens 501, and then separated into a fundamental wave and a harmonic wave by the beam splitter 502. The separated harmonic wave is converged by the first exit side coupling lens unit 205a for incidence into the first harmonic propagation optical fiber 203a and propagation therethrough.

On the other hand, the separated remaining fundamental wave is incident into the second incident side coupling lens unit 504 by the mirror 503, and concentrated on the second incident side coupling lens unit 504 for incidence into the second wavelength conversion element 202b. Thus, the harmonic wave and the remaining fundamental wave are generated from the second wavelength conversion element 202b. The harmonic wave and the remaining fundamental wave are converged by the second exit side coupling lens unit 205b for incidence into the second harmonic propagation optical fiber 203b and propagation therethrough.

The generated harmonic wave is outputted from the two optical fibers i.e. the first harmonic propagation optical fiber 203a and the second harmonic propagation optical fiber 203b. These two optical fibers may be jointly formed into a single fiber by a combiner or a bundle fiber.

In this embodiment, the wavelength conversion module has two wavelength conversion elements. Alternatively, the wavelength conversion module may have three or more wavelength conversion elements.

In the conventional wavelength conversion device, in the case where a wavelength conversion element is additionally provided to extract a harmonic wave from the remaining fundamental wave exiting from the first wavelength conversion element, complicated alignment of optical components constituting the wavelength conversion device has been required. On the other hand, in the wavelength conversion module 510, optical components are jointly fixed in assembling the components into a module. Accordingly, the above arrangement is less likely to cause alignment displacement, thereby enhancing reliability on wavelength conversion. Also, there is no need of providing large-sized heat-releasing means or a like device, because the remaining fundamental wave is wasted during propagation through the first harmonic propagation optical fiber 203a and the second harmonic propagation optical fiber 203b.

Fourth Embodiment

Figure 7A:
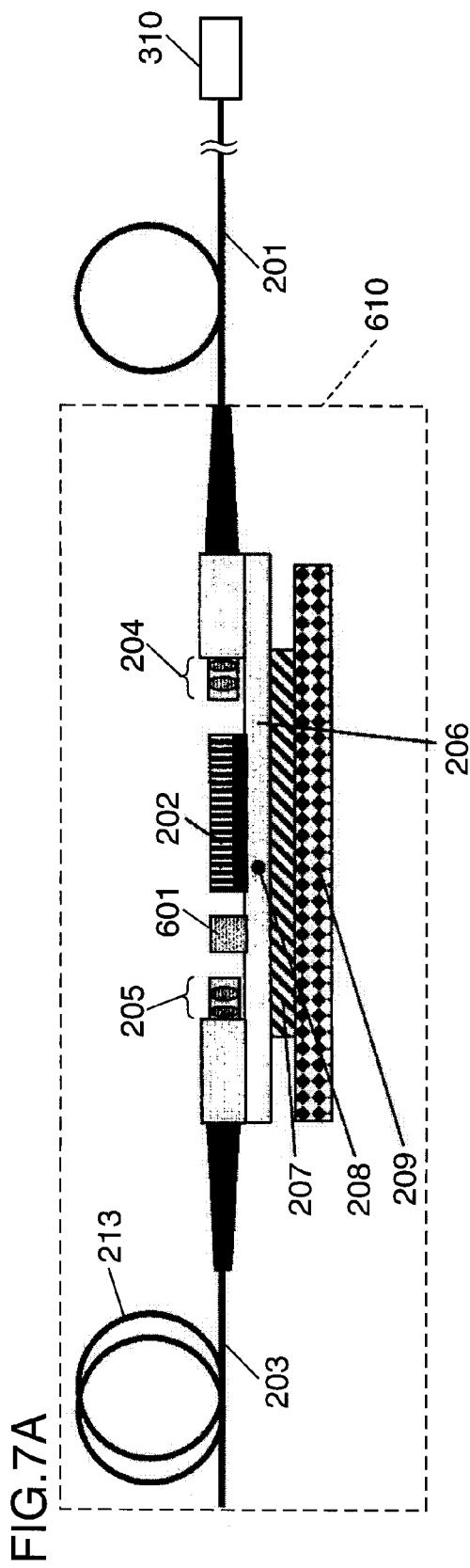
FIG. 7A is a side view of a wavelength conversion module for multi-stage (cascade) connection.
Figure 7B:
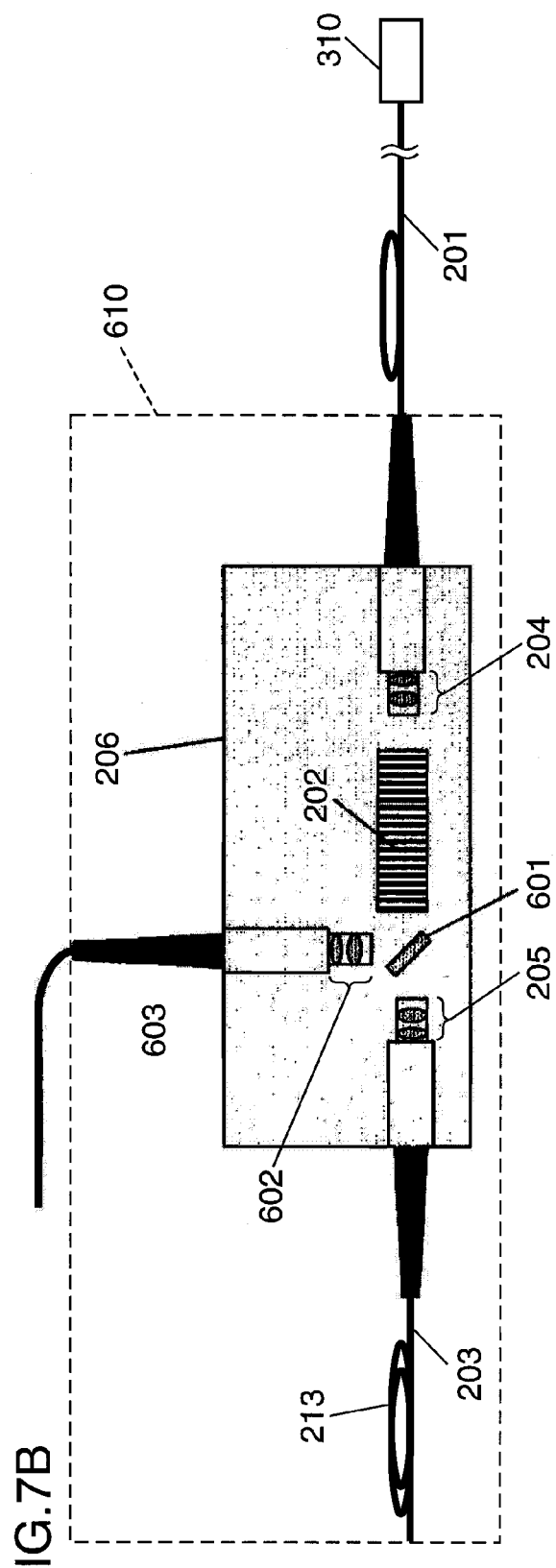
FIG. 7B is a top plan view of the wavelength conversion module for multi-stage (cascade connection).

An arrangement of a wavelength conversion module 610 is described referring to FIGS. 7A and 7B.

FIG. 7A is a side view of the wavelength conversion module 610. FIG. 7B is a top plan view of the wavelength conversion module 610. Constituent elements in the fourth embodiment with the same reference numerals as in the first through the third embodiments are identical or equivalent to those in the first through the third embodiments, and accordingly, detailed description thereof is omitted herein.

Referring to FIGS. 7A and 7B, the reference numeral 201 shows a first fundamental wave propagation optical fiber, 603 shows a second fundamental wave propagation optical fiber, 202 shows a first wavelength conversion element, 203 shows a first harmonic propagation optical fiber, 204 shows a first incident side coupling lens unit, 601 shows a beam splitter, 205 shows a first exit side coupling lens unit, 602 shows a second exit side coupling lens unit, 206 shows a base member, 207 shows a peltier element, 208 shows a temperature sensor, 209 shows a heat sink, and 310 shows a laser light source.

The wavelength conversion module 610 has a feature that almost all the remaining fundamental wave exiting from the first wavelength conversion element 202 is separated by the beam splitter 601, and that the remaining fundamental wave is converged by the second exit side coupling lens unit 602 for incidence into the second fundamental wave propagation optical fiber 603. By using the wavelength conversion module 610 having the above arrangement, multiple wavelength conversion modules can be cascade-connected.

Figure 8:
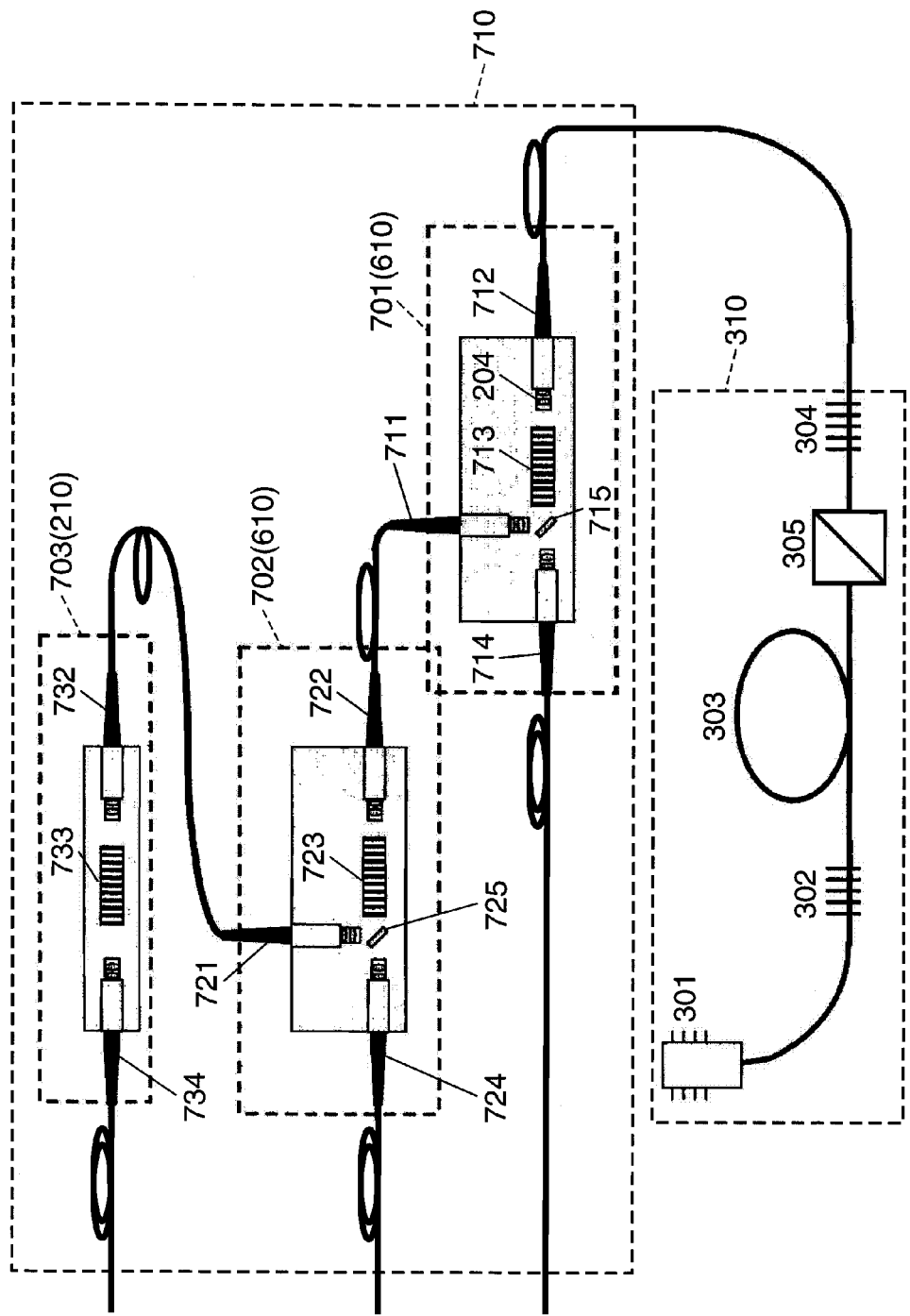
FIG. 8 is a diagram showing an arrangement of a laser light source device incorporated with a multi-stage wavelength conversion module unit.

FIG. 8 shows a laser light source device provided with a wavelength conversion module unit 710 constructed by cascade-connecting multiple wavelength conversion modules. The wavelength conversion module 610 is used as a wavelength conversion module 701 at a first stage of the wavelength conversion module unit 710, and as a wavelength conversion module 702 at a second stage of the wavelength conversion module unit 710. The wavelength conversion module 210 of the first embodiment is used as a last-stage wavelength conversion module 703 of the wavelength conversion module unit 710.

Referring to FIG. 8, the reference numeral 701 shows the first-stage wavelength conversion module, 702 shows the second-stage wavelength conversion module, and the reference numeral 703 shows the last-stage wavelength conversion module. The reference numerals 712, 722, and 732 each shows a first fundamental wave propagation optical fiber; 714, 724, and 734 each shows a first harmonic propagation optical fiber; 711 and 721 each shows a second fundamental wave propagation optical fiber; 713, 723, and 733 each shows a wavelength conversion element; and 715 and 725 each shows a beam splitter.

In the wavelength conversion module 710 unit, a fundamental wave emitted from the laser light source 310 propagates through the first fundamental wave propagation optical fiber 712 connected to the first-stage wavelength conversion module 701. Upon incidence into the wavelength conversion element 713, a part of the fundamental wave is subjected to wavelength conversion into a harmonic wave. The harmonic wave, and the remaining fundamental wave which has not undergone the wavelength conversion are separated by the beam splitter 715. Almost all the separated remaining fundamental wave is incident into the second fundamental wave propagation optical fiber 711. The separated harmonic wave exits from the first harmonic propagation optical fiber 714.

The second fundamental wave propagation optical fiber 711 in the first-stage wavelength conversion module 701 is connected to the first fundamental wave propagation optical fiber 722 in the second-stage wavelength conversion module 702. In this arrangement, the remaining fundamental wave generated in the first-stage wavelength conversion module 701 is allowed to be incident into the wavelength conversion element 723 in the second-stage wavelength conversion module 702. Upon incidence into the wavelength conversion element 723, a part of the fundamental wave is subjected to wavelength conversion into a harmonic wave. The harmonic wave, and the remaining fundamental wave which has not undergone the wavelength conversion are separated by the beam splitter 725. Almost all the separated remaining fundamental wave is incident into the second fundamental wave propagation optical fiber 721. The separated harmonic wave exits from the first harmonic propagation optical fiber 724.

The second fundamental wave propagation optical fiber 721 in the second-stage wavelength conversion module 702 is connected to the first fundamental wave propagation optical fiber 732 in the last-stage wavelength conversion module 703. In this arrangement, the remaining fundamental wave generated in the second-stage wavelength conversion module 702 is allowed to be incident into the wavelength conversion element 733 in the last-stage wavelength conversion module 703.

As described above, the second-stage wavelength conversion module 702 is connected to the last stage wavelength conversion module 703. A part of the remaining fundamental wave generated in the second-stage wavelength conversion module 702 is subjected to wavelength conversion into a harmonic wave by the wavelength conversion element 733 in the last-stage wavelength conversion module 703. The harmonic, and the remaining fundamental wave which has not undergone the wavelength conversion are incident into the first harmonic propagation optical fiber 734 and propagate therein. Then, the remaining fundamental wave is wasted in the first harmonic propagation optical fiber 734 and the harmonic wave is allowed to exit from the first harmonic propagation optical fiber 734.

Alternatively, the harmonic propagation optical fibers 714, 724, and 734 may be jointly formed into a single fiber by a combiner or a bundle fiber for outputting a harmonic wave.

In this embodiment, three wavelength conversion modules are connected to each other to constitute a multi-stage wavelength conversion module unit. Alternatively, a multi-stage wavelength conversion module unit may be constructed by connecting four or more wavelength conversion modules.

The first fundamental wave propagation optical fiber and the second fundamental wave propagation optical fiber in the multi-stage wavelength conversion module unit 710 may preferably be a polarization maintaining fiber, because a fundamental wave to be incident into a wavelength conversion element should be a linearly polarized beam. However, in the case where a polarized wave to be subjected to wavelength conversion by a wavelength conversion module at an even-number stage and a polarized wave to be subjected to wavelength conversion by a wavelength conversion module at an odd-number stage are located orthogonal, two optical axes of the wavelength conversion elements are located to be tilted by 45 degrees each other, or a type 2 phase matching crystal is used in angle phase matching, a general single mode fiber may be used as a fundamental wave propagation fiber.

As compared with a conventional multi-stage wavelength conversion device incorporated with multiple wavelength conversion elements, the multi-stage wavelength conversion module unit 710 constructed by connecting the multiple wavelength conversion modules 610 is advantageous in requiring less space, and facilitating optical adjustment. Specifically, an optical fiber is used for light incidence and exit in the wavelength conversion module 610. Accordingly, alignment of wavelength conversion elements can be completed at the time of assembling the wavelength conversion module 610. In aligning multiple wavelength modules at the time of connection, it is required to align optical fibers by fusing. The optical fibers are easily fused by an optical fiber fusion splicer. Accordingly, installation and exchange of wavelength conversion modules are advantageously facilitated. Further, alignment of wavelength conversion elements in the wavelength conversion module 610 is adjusted and fixed at the time of production. Accordingly, reliability on wavelength conversion means is enhanced because of no generating alignment displacement. Furthermore, since the number of parts can be reduced, the production cost can be reduced.

Fifth Embodiment

A laser light source device incorporated with the wavelength conversion module described in the first, the second, the third, or the fourth embodiment may be used as a display light source in a laser display (two-dimensional image display device), a backlight light source in a liquid crystal display device, or a processing laser light source in a laser processing device. Alternatively, the laser light source device may be used in various technical fields where laser beams have been conventionally used, such as optical disc devices or measuring devices. For instance, in the case where the aforementioned laser light source device is used in an optical disc device, a stable and high output with a high coherence can be obtained, which is advantageous in a technical filed such as holographic recording.

Additionally, the aforementioned laser light source device can be utilized as an illumination light source. Use of a fiber laser as a fundamental wave light source provides high conversion efficiency. Accordingly, electricity-to-light conversion can be performed with high efficiency. Also, use of an optical fiber is advantageous in transmitting light to a remote place with less light loss. As a result, by generating light at a specific site, and transmitting the light to a remote place, room illumination by local generation of light is possible. Further, since a fiber laser can be connected to a fiber with less light loss, this arrangement is advantageous in conveying light.

Figure 9:
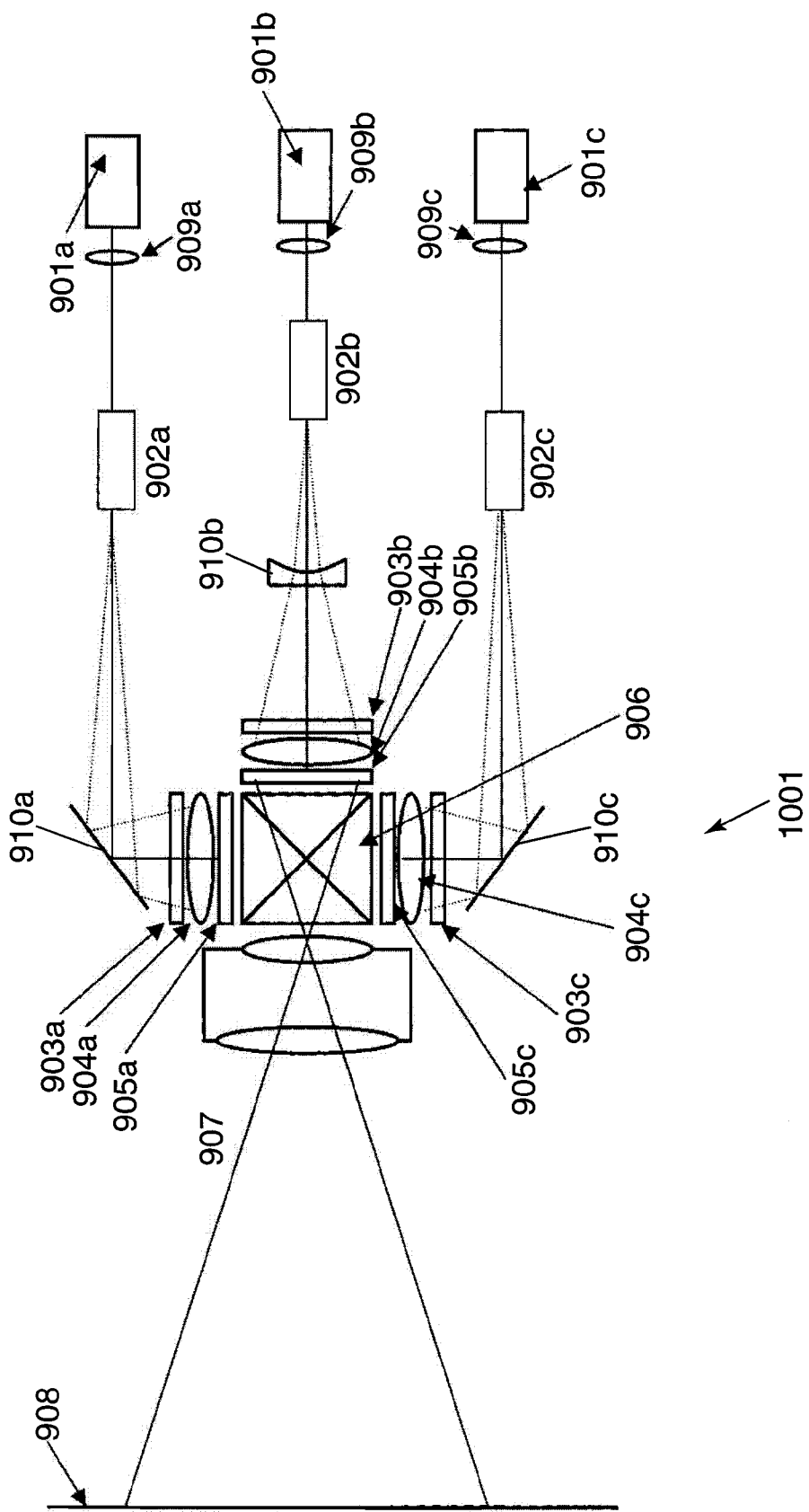
FIG. 9 is a diagram showing an example of a laser display device (two-dimensional image display device) incorporated with a laser light source device.

As an example of the laser light source device incorporated with the wavelength conversion module described in the first, the second, the third, or the fourth embodiment, an example of an arrangement of a laser display (two-dimensional image display device) to which the laser light source is applied is described, referring to FIG. 9.

Laser light sources 901a, 901b, and 901c for respectively emitting laser beams of three different colors of red (R), green (G), and blue (B) are used as a laser light source device. A GaAs-based semiconductor laser of 638 nm wavelength is used as the red laser light source 901a. A GaN-based semiconductor laser of 465 nm wavelength is used as the blue laser light source 901c. A green laser light source device, equipped with a wavelength conversion element, for reducing the wavelength of an infrared laser beam to one-half of the original wavelength, is used as the green laser light source 901b. The laser light source device provided with the wavelength conversion module described in the first, the second, the third, or the fourth embodiment may be used as the green laser light source device for emitting green laser beams by wavelength conversion.

Laser beams emitted from the light sources 901a, 901b, and 901c are two-dimensionally scanned by reflective two-dimensional beam scanning means 902a, 902b, and 902c, respectively. After passing through a mirror 910a, a concave mirror 910b, and a mirror 910c, the laser beams are incident on diffusers 903a, 903b, and 903c, respectively. The laser beams of the respective colors after two-dimensionally scanning on the diffusers 903a, 903b, and 903c are guided to two-dimensional space light modulators 905a, 905b, and 905c via field lenses 904a, 904b, and 904c, respectively.

In this embodiment, image data is divided into R, G, and B. Each signal of R, G, and B is inputted to the two-dimensional space light modulation elements 905a, 905b, and 905c, respectively, and synthesized into a color image by a dichroic prism 906. The synthesized color image is projected onto a screen 908 by a projection lens 907. The diffusers 903a, 903b, and 903c are disposed in front of the two-dimensional space modulation elements 905a, 905b, and 905c, respectively, and serve as a speckle noise remover. In this arrangement, speckle noises can be reduced by oscillating the diffusers 903a, 903b, and 903c. A lenticular lens or a like device may be used as the speckle noise remover.

In this embodiment, a semiconductor laser is used with respect to each of the colors. Alternatively, a single fiber capable of obtaining an output corresponding to outputs from two to eight semiconductor lasers may be constructed by using a bundle fiber. In the modification, the wavelength spectrum width is as broad as several nm. The wide spectrum width is advantageous in suppressing generation of speckle noises.

The two-dimensional space modulation element 905a, 905b, 905c may be a reflective space modulation element integrated with micromirrors such as a DMD mirror. Alternatively, the two-dimensional space modulation element 905a, 905b, 905c may be a two-dimensional space modulation element incorporated with a liquid crystal panel, or a two-dimensional space modulation element incorporated with a galvanometric mirror or a mechanical microswitch (MEMS). In using a light modulation element with less influence of a polarization component to light modulation characteristics, such as a reflective space modulation element, MEMS, or a galvanometric mirror, there is no need that the optical fiber for propagating a harmonic wave should be a polarized wave maintaining fiber such as a PANDA fiber. However, in using a two-dimensional space modulation element provided a liquid crystal panel, it is desirable to use a polarized wave maintaining fiber because there is a close relation between modulation characteristics and polarization characteristics.

In using a two-dimensional space modulation element provided a liquid crystal panel, degradation of the liquid crystal panel by receiving the infrared component can be suppressed because an infrared component as a fundamental wave component is wasted by a harmonic propagation optical fiver in case of the using aforementioned laser light source device as a light source.

In the laser display device of this embodiment, it is preferable to wind the harmonic propagation optical fiber provided in the wavelength conversion module of the laser light source device around a site having a high heat releasing performance of the laser display device.

Figure 10A:
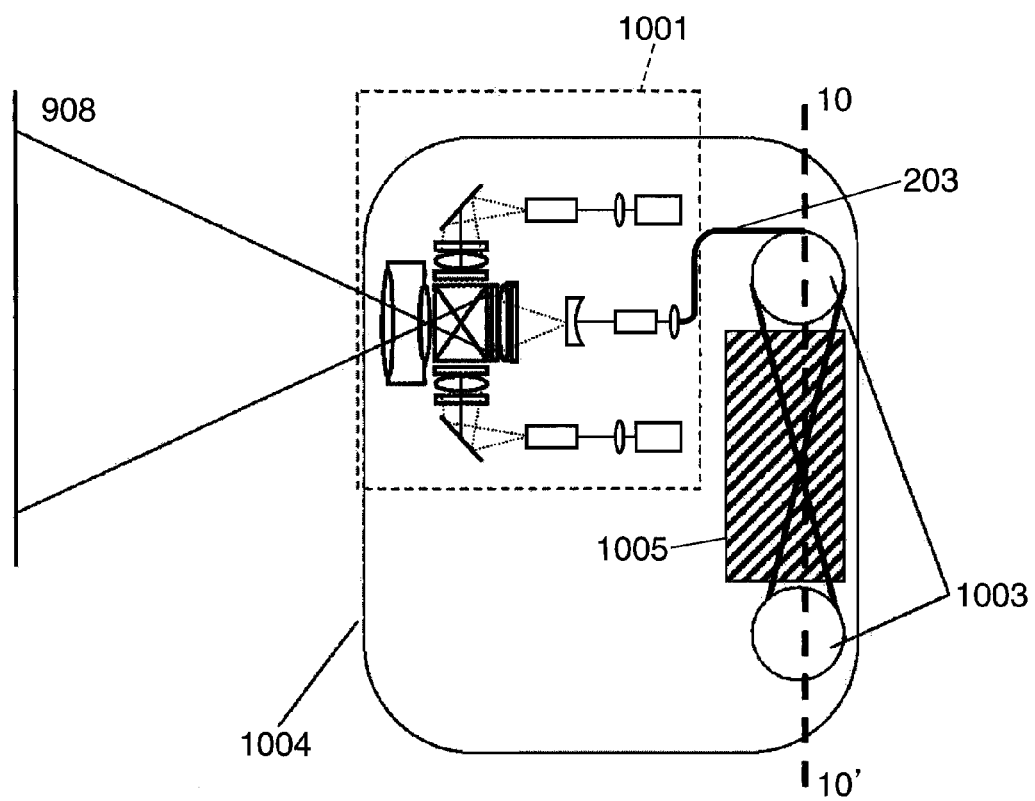
FIG. 10A is a diagram showing an example of a laser display assembly incorporated with a laser light source device.
Figure 10B:
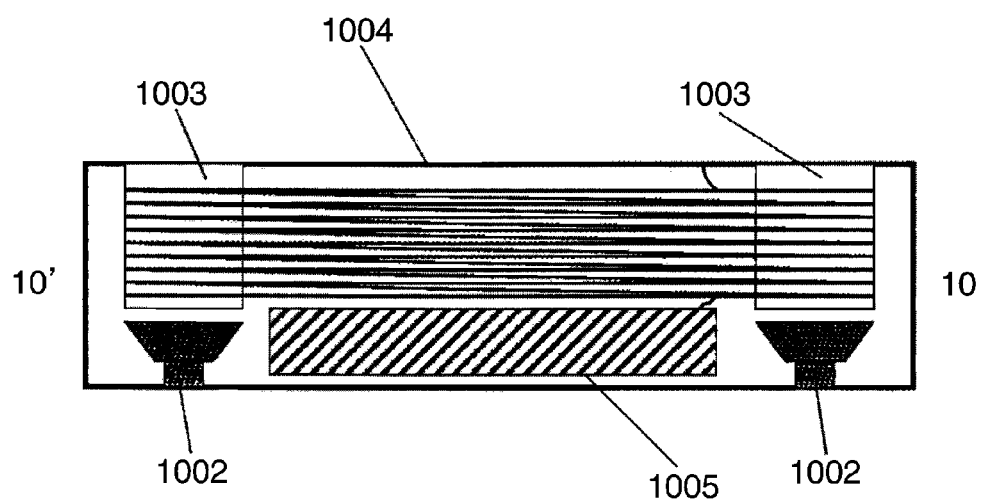
FIG. 10B is a cross-sectional view taken along the line 10-10' in FIG. 1A.

A specific example of the arrangement is described referring to FIGS. 10A and 10B. FIG. 10A is a diagram showing an arrangement of a laser display assembly 1004 provided with a laser display device 1001 and speakers 1002. FIG. 10B is a cross-sectional view taken along the line 10-10' in FIG. 10A.

Referring to FIGS. 10A and 10B, the reference numeral 1001 shows the laser display device, 1005 shows a green laser light source, 1002 shows the speaker, 1003 shows a tubular portion of the speaker, and 1004 shows the laser display assembly. The reference numeral 203 shows a harmonic propagation fiber to be drawn from the green laser light source device 1005.

In the case where the harmonic propagation fiber 203 has a curved portion with a small curvature radius, the energy of the remaining fundamental wave can be easily released from the curved portion. Accordingly, the heat releasing performance can be enhanced by winding the harmonic propagation fiber 203 around a predetermined tubular portion of the laser display assembly 1004. An example of the above arrangement is shown in FIGS. 10A and 10B. Specifically, after the harmonic propagation optical fiber 203 drawn from the green laser light source device 1005 is wound around the tubular portions 1003 of the speakers, as shown in FIG. 10B, the harmonic propagation optical fiber 203 is mounted in the laser display device 1001, as shown in FIG. 10A. The heat can be efficiently released by utilizing a sound pressure generated from the speakers by winding the harmonic propagation optical fiber 203 around the tubular portions 1003 of the speakers. Also, the generated heat is efficiently dissipated by passing the harmonic propagation optical fiber 203 through the inside surface of the case of the laser display assembly 1004.

Figure 11:
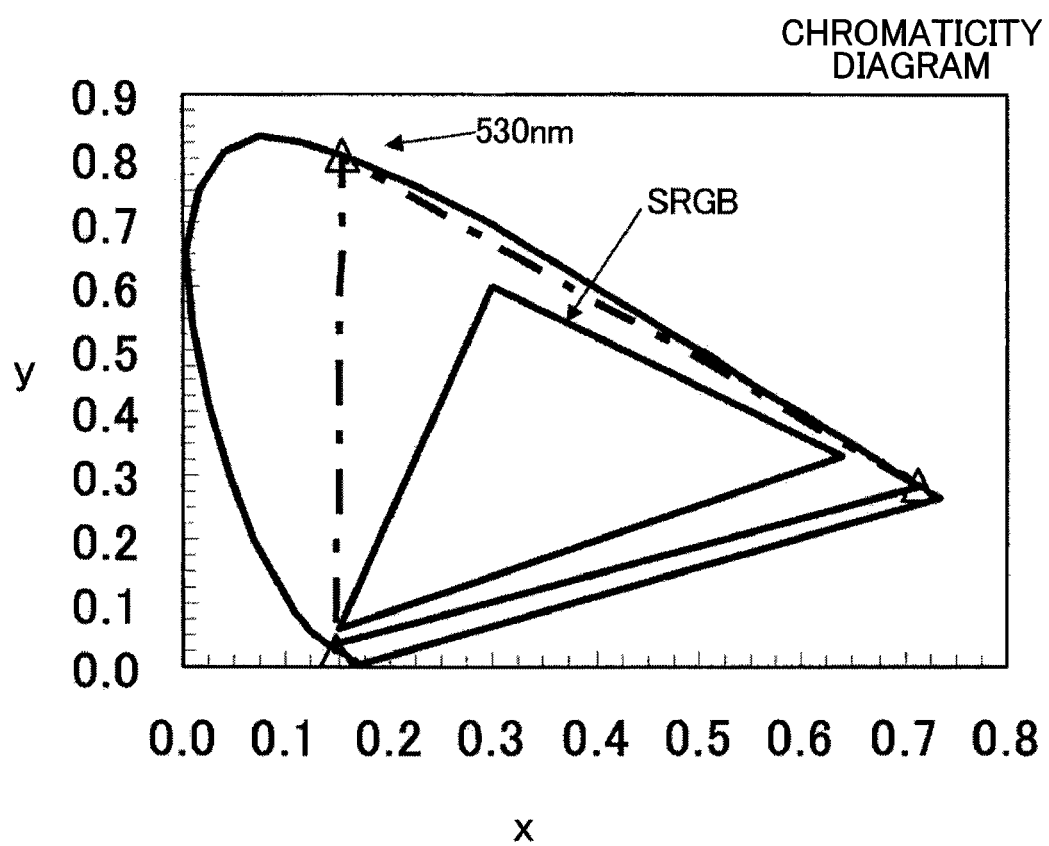
FIG. 11 is a diagram showing a color reproduction area defined by S-RGB standard, and a color reproduction area obtained by selecting a laser beam of 530 nm wavelength as a green laser beam.

FIG. 11 is a diagram showing a color reproducing area obtained by selecting a laser beam of 530 nm wavelength as a green laser beam of the laser display device, and a color reproducing area defined by S-RGB standard. In FIG. 11, the color reproducing area obtained by selecting a laser beam of 530 nm wavelength as a green laser beam is wider than the S-RGB standard color reproducing area reproducible by the conventional image display device, at any position. Thus, the laser display device of this embodiment enables to reproduce high-precision images by using the aforementioned laser light source as a light source device.

A Yb-doped fiber laser light source (Yb-doped fiber laser) is preferably used as a green laser light source device to be used in the laser display device of this embodiment. Using the Yb-doped fiber laser as a light source in the laser light source device of this embodiment is advantageous in generating green laser beams in a wide wavelength range from 520 to 550 nm. Thus, the color reproducing area can be further increased by using the Yb-doped fiber laser.

The aforementioned laser light source device may be incorporated in a device for projecting an image from the rear of a screen (rear projection display), in place of the two-dimensional image display device having the above arrangement.

Sixth Embodiment

The laser light source device incorporated with the wavelength conversion module described in the first, the second, the third, or the fourth embodiment may be used as a backlight light source for use in a liquid crystal display device. Using the laser light source device as a backlight light source enables to realize a high-efficiency, high-luminance liquid crystal display device. Use of the laser light source device as a backlight light source enables to maintain the temperature of a liquid crystal display portion by releasing the energy of a remaining fundamental wave from an optical fiber. This contributes to maintaining a high response speed of the laser light source device. Also, use of the laser light source device as a backlight light source enables to waste an infrared component as a fundamental wave from irradiation laser beams by a harmonic propagation optical fiber. This is advantageous in suppressing degradation of a liquid crystal panel resulting from an infrared component.

Figure 12B:
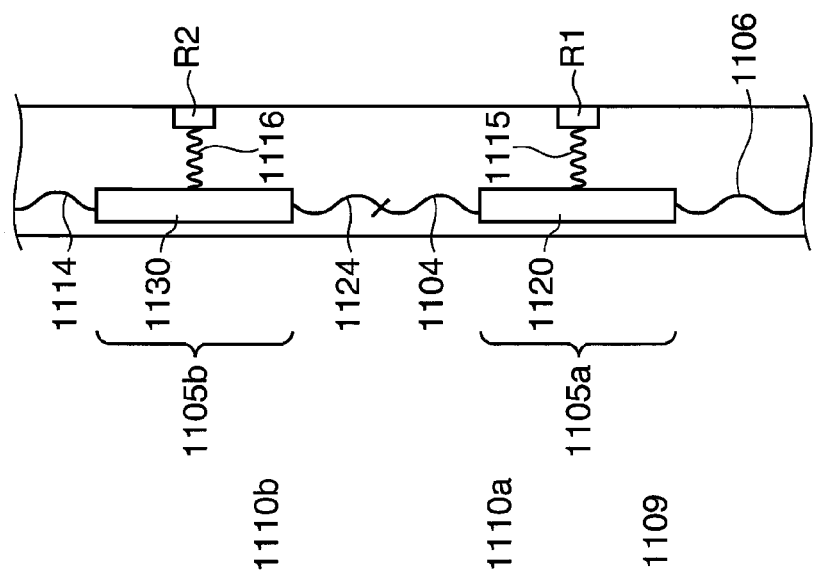
FIG. 12B is a partially enlarged view of the backlight device shown in FIG. 12A.
Figure 12A:
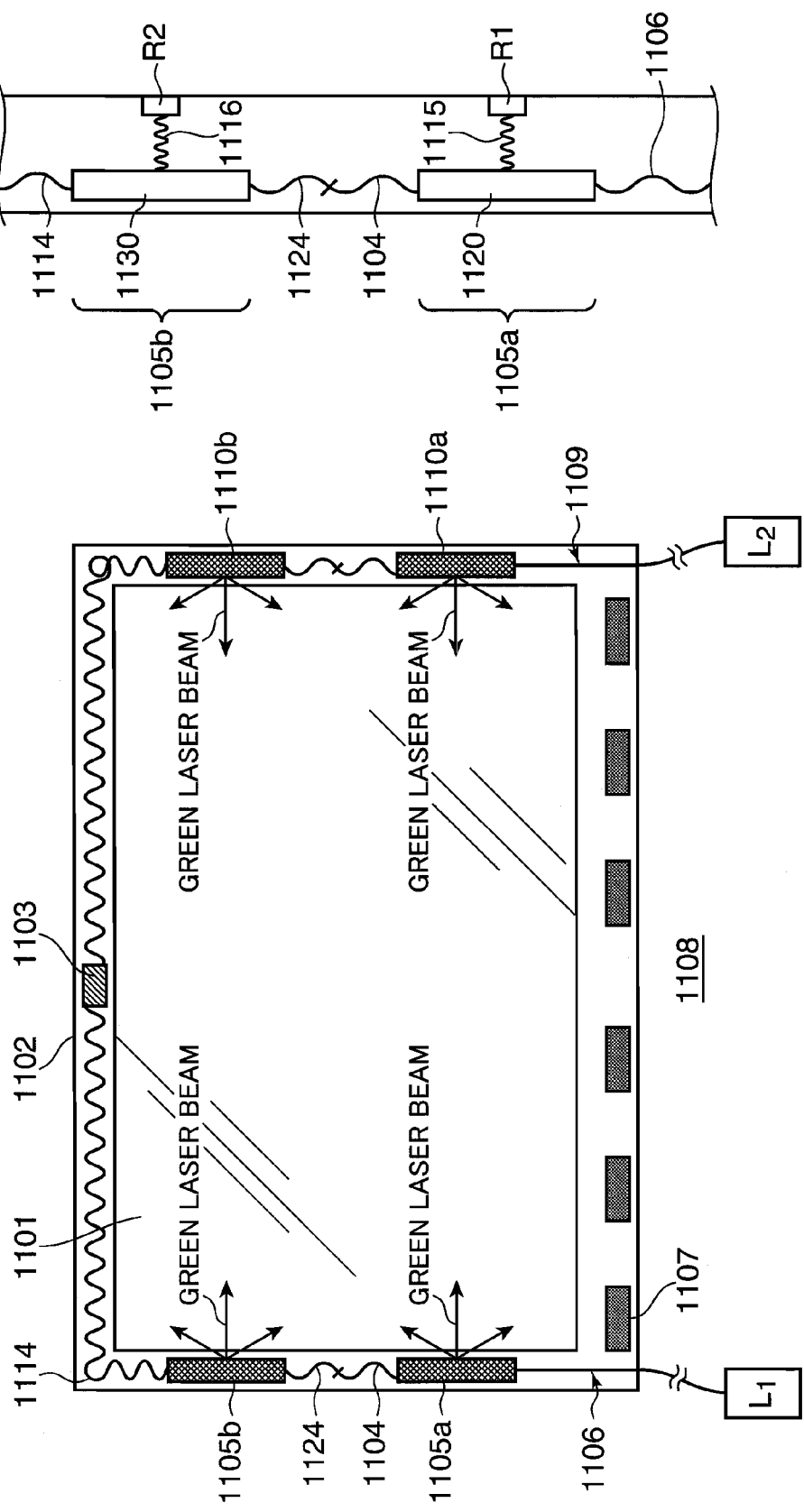
FIG. 12A is a diagram showing an example of an arrangement of a backlight device incorporated with a laser light source device.

FIG. 12A is a diagram showing an arrangement of a liquid crystal display device 1108 incorporated with the aforementioned laser light source device as a backlight light source. The liquid crystal display device 1108 includes a multi-stage wavelength conversion module unit constituted of a pair of wavelength conversion modules, on each of left and right sides of the liquid crystal display device 1108, wherein the left-side multi-stage wavelength conversion module unit and the right-side multi-stage wavelength conversion module unit perform an identical operation. To simplify the description, merely the operation of the left-side multi-stage wavelength conversion module unit in the liquid crystal display device 1108 is described referring to an enlarged schematic view of FIG. 12B. It should be noted that the right-side multi-stage wavelength conversion module unit performs the same operation as the left-side multi-stage wavelength conversion module unit.

Referring to FIGS. 12A and 12B, the reference numeral 1101 shows a liquid crystal display portion, 1105a and 1110a each shows a first-stage wavelength conversion module, and 1105b and 1110b each shows a second-stage wavelength conversion module. The liquid crystal display device 1108 further includes a liquid crystal driving terminal 1107 for controlling display of an image by application of a voltage. An unillustrated light guiding plate is provided on the rear of the liquid crystal display portion 1101.

The first-stage wavelength conversion modules 1105a and 1110a, and the second-stage wavelength conversion modules 1105b and 1110b are encased in a rim 1102. Preferably, portions of the rim 1102 near the sites where the wavelength conversion modules are arranged are treated by an infrared absorbing material e.g. black almite. The above treatment is made to prevent degradation of the liquid crystal material resulting from incidence of an infrared light onto the liquid crystal panel.

The first-stage wavelength conversion module 1105a shown in FIG. 12B is constructed by optically connecting a first wavelength conversion element 1120 to a first fundamental wave propagation optical fiber 1106, a second fundamental wave propagation optical fiber 1104, and a first harmonic propagation optical fiber 1115. The second-stage wavelength conversion module 1105b is constructed by optically connecting a second wavelength conversion element 1130 to a first fundamental wave propagation optical fiber 1124, a second fundamental wave propagation optical fiber 1114, and a second harmonic propagation optical fiber 1116. The second fundamental wave propagation optical fiber 1104 in the first-stage wavelength conversion module 1105a, and the first fundamental wave propagation optical fiber 1124 in the second-stage wavelength conversion module 1105b are optically connected to each other.

A fundamental wave emitted from a laser light source L1 is entered from the fundamental wave entering portion of the first fundamental wave propagation optical fiber 1106 for propagation through the first fundamental wave propagation optical fiber 1106. Then, the fundamental wave is incident into the wavelength conversion element 1120 in the first-stage wavelength conversion module 1105a. Upon incidence into the wavelength conversion element 1120, a part of the fundamental wave is subjected to wavelength conversion into a second harmonic wave and exits from the first harmonic wave propagation optical fiber 1115. The remaining fundamental wave exits from the first wavelength conversion element 1120, and propagates through the second fundamental wave propagation optical fiber 1104 and the first fundamental wave propagation optical fiber 1124 and enters into the wavelength conversion element 1130 in the second-stage wavelength conversion module 1105b. Upon entering into the second wavelength conversion element 1130, a part of the fundamental wave is converted into a second harmonic wave and exits from the second harmonic propagation optical fiber 1116. On the other hand, the remaining fundamental wave exits from the second wavelength conversion element 1130, propagates through the second fundamental wave propagation optical fiber 1114, and reaches a distal end portion 1103.

The second harmonics wave, as green laser beams, exiting from the first harmonic propagation optical fiber 1115 and the second harmonic propagation optical fiber 1116 are projected as a sheet beam by optical systems R1 and R2 each constituted of an aspherical lens, a Fresnel lens, or a like element, and guided to the light guiding plate for uniform irradiation onto the liquid crystal panel.

On the other hand, the remaining fundamental wave exiting from the second wavelength conversion element 1130 propagates through the second fundamental wave propagation optical fiber 1114 connected to the second wavelength conversion element 1130, and reaches the distal end portion 1103 connected to a distal end of the second fundamental wave propagation optical fiber 1114. In this embodiment, preferably, the second fundamental wave propagation optical fiber 1114 may be formed into a wave-like configuration having a feature that the height of the individual waves is gradually decreased as the second fundamental wave propagation optical fiber 1114 approaches the distal end portion 1103, as shown in FIG. 4D. The above configuration is advantageous in efficiently dispersing and releasing the heat from the second fundamental wave propagation optical fiber 1114 during propagation therethrough.

The energy of the remaining fundamental wave that has not been dissipated from the second fundamental wave propagation optical fiber 1114 may be released from the distal end portion 1103 made of a material having a superior heat releasing performance.

In FIG. 12A, a multi-stage wavelength conversion module unit obtained by connecting two wavelength conversion modules is provided at each of the left and right sides of the liquid crystal display device 1108, as a backlight light source. Alternatively, the number of wavelength conversion modules to be connected, or the number of wavelength conversion module units may be properly selected depending on the area of the liquid crystal display device, or a like factor.

Seventh Embodiment

Figure 13:
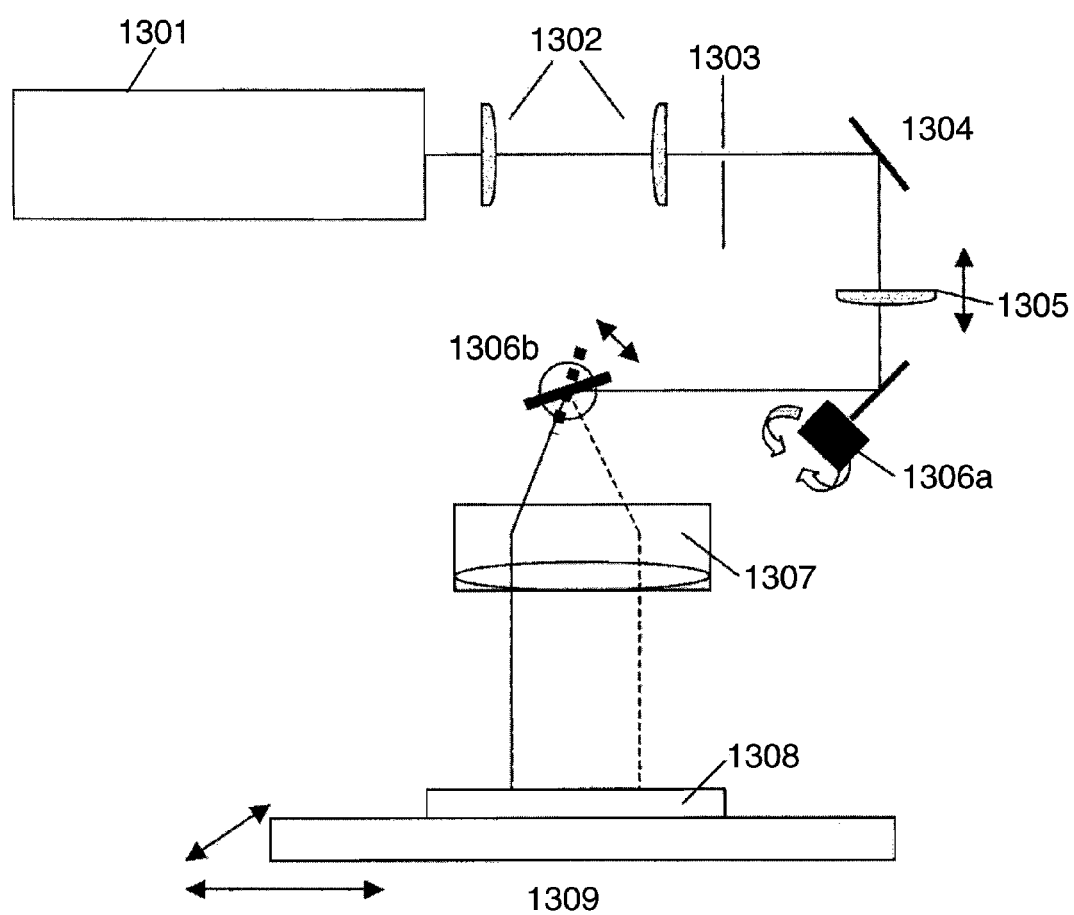
FIG. 13 is a diagram showing an example of a laser processing/drawing device incorporated with a laser light source device.
Figure 14:
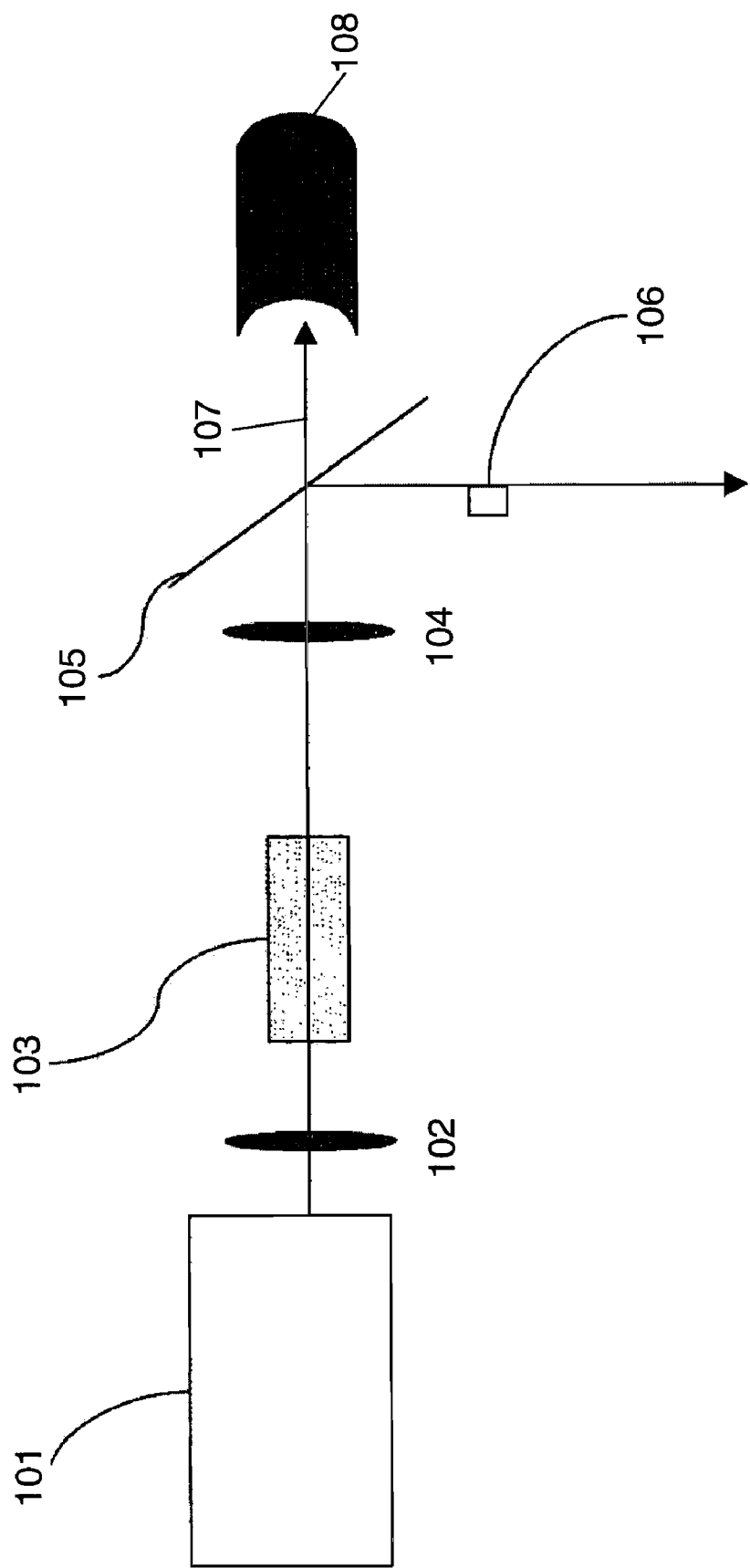
FIG. 14 is a diagram showing an arrangement of a conventional wavelength conversion device.
Figure 15:
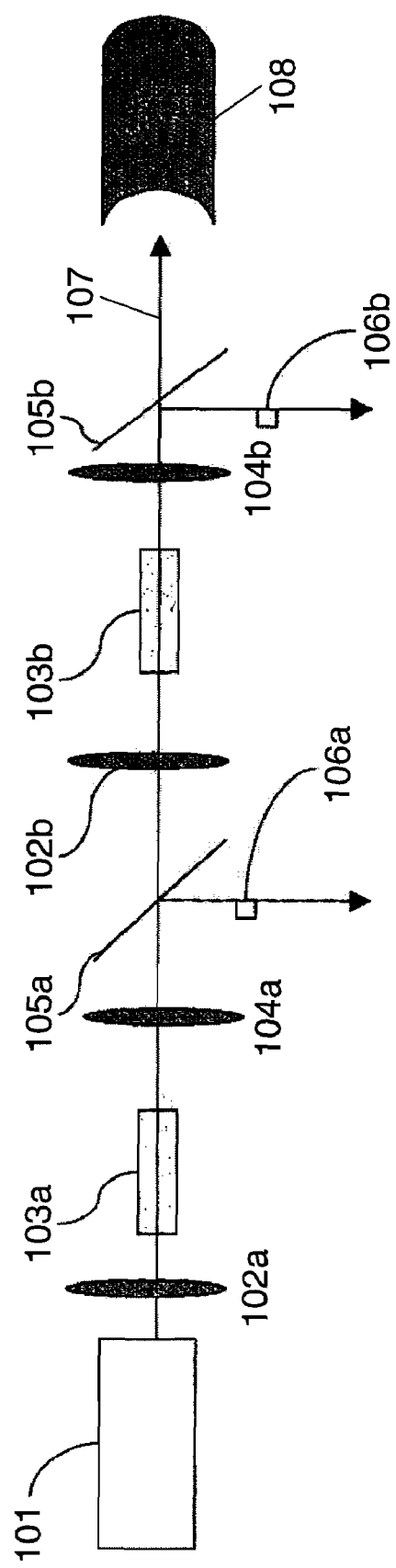
FIG. 15 is a diagram showing an arrangement of the conventional wavelength conversion device.

In this section, description is made on an example of a laser processing device to which the laser light source device incorporated with the wavelength conversion module described in the first, the second, the third, or the fourth embodiment is applied, referring to FIG. 13. In this embodiment, a laser light source device (green laser beams of a wavelength near 530 nm) incorporated with the laser light source device is used as a processing laser light source 1301. The laser processing device in this embodiment is a laser drawing-processing device suitable for processing a copper containing member such as a printed circuit board. The arrangement of the processing laser light source 1301 is substantially the same as that of the laser light source device incorporated with the wavelength conversion module described in the first, the second, the third, or the fourth embodiment, and accordingly, detailed description thereof is omitted herein.

Green laser beams emitted from the processing laser light source 1301 are collimated by a coupling lens unit 1302. Thereafter, the laser beams have their beam diameters adjusted while passing through a slit 1303, have their optical axis bent by a mirror 1304 or a like component, and then are guided to galvanometric mirrors 1306a and 1306b via a lens 1305. The galvanometric mirrors 1306a and 1306b each is operative to shift the optical axis of laser beams in a processing direction (x-direction or y-direction). Thereafter, the laser beams are perpendicularly incident on an object 1308 to be processed, which is mounted on an x-y stage 1309 through an f-θ lens 1307, whereby an intended processing is performed. The wavelength range of laser beams to be used in processing is desirably a wavelength range from 400 nm, which is usable in mastering an optical disc or performing a like operation to 600 nm, which is usable in fusion bonding a resin.

In this embodiment, laser beams for processing are moved by a mirror. Alternatively, it is possible to perform processing by concentrated beams obtained by concentrating a harmonic wave exiting from a harmonic propagation optical fiber 203 at a position immediately in front of the object to be processed. In the modification, there is no need of providing a beam shaping optical system such as the coupling lens unit 1302 and the slit 1303, the galvanometric mirrors 1306a and 1306b, and the f-θ lens 1307. Accordingly, the laser processing device can be advantageously miniaturized, and produced with a reduced cost. Further, the above arrangement provides the following advantage. Since the f-θ lens 1307 has temperature characteristics, it is necessary to maintain the room temperature where the laser processing device is to be used to a constant value, and to administer a characteristic profile of the lens. Unlike the conventional arrangement, the above arrangement does not require the administration, because laser beams exiting from the fiber can be concentrated at a position immediately in front of the object to be processed. Thus, reliability and usability of the laser processing device are enhanced.

A laser light source incorporated with a LBO (lithium triborate ($LiB_3O_5$)) crystal is used as the laser light source to be used in the conventional laser processing device. The LBO crystal has a deliquescent property. Accordingly, in a long-term unused condition, it is necessary to heat the crystal to 150° C., or use the crystal in a dry ambient condition. $LiNbO_3$ doped with 5 mol MgO, which is recited in the section of the background art, does not have a deliquescent property. However, in most of the cases using the above crystal, an output is at most from 200 to 300 mW. In the case where a green laser output of 2 W or more is to be obtained, the crystal may be cracked, or a like drawback may occur. In the case where a $LiNbO_3$ crystal doped with 5.6 mol MgO or a like crystal is used in order to obtain a watt-class high-output by green laser beams, an output of 3 W or more is stably obtained. Also, in the above arrangement, since the crystal has no deliquescent property, crystal degradation can be eliminated even in a power-off condition where the laser processing device is not used. As a result, a consumption electric power of a device for driving a heater can be reduced, which is further advantageous in miniaturizing the laser processing device.

In the processing laser light source 1301, a fundamental wave exiting from a fiber laser is subjected to wavelength conversion by the wavelength conversion module described in the first, the second, the third, or the fourth embodiment. A harmonic laser beam is easily affected by crystal break resulting from visible light absorption or output fluctuation, as the wavelength is shorter from blue-green laser beams to blue laser beams. However, it is possible to change the wavelength of a fundamental wave, and generate argon ion laser beams (488 nm, 514 nm) by using the aforementioned laser light source device. Obtaining oscillation wavelengths of argon ion laser beams is advantageous in reducing the volume of a light source to about 20 to 30% relative to a conventional large-sized light source using a glass tube.

The wavelength conversion module, the laser light source device, the two-dimensional image display device, the backlight light source, the liquid crystal display device, and the laser processing device exemplified in the aforementioned embodiments are merely an example. It is needless to say that modifications and/or alterations other than the above may be applied to the present invention.

As described above in detail, an aspect of the invention is directed to a wavelength conversion module comprising: a first fundamental wave propagation optical fiber for propagating a fundamental wave emitted from a laser light source; a first wavelength conversion element, optically connected to the first fundamental wave propagation optical fiber, for converting the fundamental wave exited from the first fundamental wave propagation optical fiber into a harmonic; and a first harmonic propagation optical fiber, optically connected to the first wavelength conversion element, for propagating the harmonic wave exited from the first wavelength conversion element, wherein the first harmonic propagation optical fiber has a core diameter smaller than a core diameter of the first fundamental wave propagation optical fiber. In the above arrangement, the energy of the remaining fundamental wave is wasted in the harmonic propagation optical fiber by increasing the energy loss of the remaining fundamental wave in the harmonic propagation optical fiber. Thereby, even if a high-energy harmonic wave is to be obtained, the energy of the remaining fundamental wave can be reduced without using large-sized heat-releasing means.

In the wavelength conversion module, preferably, the core diameter of the first harmonic propagation optical fiber may be 0.9 times as large as the core diameter of the first fundamental wave propagation optical fiber, or less. In the case where the core diameter of the first harmonic propagation optical fiber is 0.9 times as large as the core diameter of the first fundamental wave propagation optical fiber, or less, the propagation loss of the remaining fundamental wave is significantly increased. Thereby, the energy of the remaining fundamental wave is sufficiently lost in the first harmonic propagation optical fiber.

Preferably, the wavelength conversion module may further comprise: a beam splitter, provided between the first wavelength conversion element and the first harmonic propagation optical fiber, for separating the harmonic wave and a remaining fundamental wave to be emitted from the first wavelength conversion element. Use of the beam splitter enables to separate the remaining fundamental wave, and the harmonic wave that has been generated by wavelength conversion. Then, a higher harmonic wave can be obtained by subjecting the separated remaining fundamental wave to wavelength conversion.

Preferably, the wavelength conversion module may further comprise: a second fundamental wave propagation optical fiber for propagating the remaining fundamental wave separated by the beam splitter. Use of the second fundamental wave propagation optical fiber enables to easily propagate the remaining fundamental wave to the other wavelength conversion module.

Preferably, the wavelength conversion module may further comprise: a second wavelength conversion element for converting a wavelength of the remaining fundamental wave separated by the beam splitter into a harmonic wave; and a second harmonic propagation optical fiber for propagating the harmonic to be emitted from the second wavelength conversion element. Since the multiple wavelength conversion elements and the harmonic propagation optical fibers connected to the wavelength conversion elements are provided in the single wavelength conversion module, more harmonics wave can be obtained from the fundamental wave.

In the wavelength conversion module, preferably, the first harmonic propagation optical fiber may include a curved portion having a predetermined curvature radius. Use of the harmonic propagation optical fiber having the curved portion enables to increase propagation loss of the remaining fundamental wave in the optical fiber.

In the wavelength conversion module, preferably, the curvature radius of the curved portion may be 60 mm or less. If the curvature radius of the curved portion is 60 mm or less, propagation loss of the remaining fundamental wave in the optical fiber is significantly increased.

In the wavelength conversion module, preferably, at least one of the first fundamental wave propagation optical fiber and the first harmonic propagation optical fiber may be a polarized wave maintaining fiber. Use of the polarized wave maintaining fiber enables to obtain solely linearly polarized beams along a predetermined crystal axis of the wavelength conversion element.

In the wavelength conversion module, preferably, the first wavelength conversion element may contain at least one kind of component selected from the group consisting of titanyl potassium phosphate, lithium niobate having a congruent composition, lithium niobate having a stoichiometric composition, lithium tantalite having a congruent composition, and lithium tantalate having a stoichiometric composition, because the component has a large nonlinear optical constant and superior wavelength conversion efficiency.

In the wavelength conversion module, preferably, the first wavelength conversion element may contain at least one kind of component selected from the group consisting of magnesium oxide doped lithium niobate having a congruent composition, and magnesium oxide doped lithium tantalate having a congruent composition, with a molar concentration of the magnesium oxide being in the range from 5.3 to 6.3 mol in the aspect of suppressing light damage or crystal degradation.

In the wavelength conversion module, preferably, the first wavelength conversion element may be a nonlinear optical single crystal having a periodically reversed polarization structure, because high conversion efficiency is obtained by quasi phase matching (QPM).

In the wavelength conversion module, preferably, the laser light source may be a Yb-doped fiber laser, because a harmonic in a wide wavelength range is obtained.

In the wavelength conversion module, preferably, the harmonic wave may have a wavelength in the range from 520 to 550 nm, because green laser beams in a wide wavelength range are obtained.

In the wavelength conversion module, preferably, the first wavelength conversion element may have a temperature at the time of wavelength conversion in the range from 20 to 60° C. in the aspect of lowering consumption electric power.

Another aspect of the invention is directed to a wavelength conversion module unit comprising a plurality of the aforementioned wavelength conversion modules being optically connected to each other in a multi-stage manner, wherein the second fundamental wave propagation optical fiber in the wavelength conversion module of the n-th stage, and the first fundamental wave propagation optical fiber in the wavelength conversion module of the (n+1)-th stage are optically connected to each other, where n is an integer of 1 or more. In the wavelength conversion module unit, a harmonic wave of a higher output can be obtained without wasting the remaining fundamental wave, by connecting the wavelength conversion module of a predetermined stage to the wavelength conversion module of a succeeding stage in the above-mentioned manner, and by defining the remaining fundamental wave exiting from the wavelength conversion module of the predetermined stage as the fundamental wave in the wavelength conversion module of the succeeding stage.

Yet another aspect of the invention is directed to a laser light source device comprising the aforementioned wavelength conversion module, wherein the wavelength conversion module is operative to output laser beams of 2 W or more in average output and 200 to 800 nm in wavelength range. The laser light source device having the above arrangement does not require heat-releasing means such as a large-sized beam dumper for wasting a remaining fundamental wave. This contributes to miniaturization of the laser light source device. Accordingly, the laser light source device can be applied to a compact consumer product such as a two-dimensional image display device.

Yet another aspect of the invention is directed to a two-dimensional image display device comprising the aforementioned laser light source device, wherein the two-dimensional image display device is operative to display an image by using the laser beams of 2 W or more in average output to be emitted from the laser light source device. The two-dimensional image display device having the above arrangement has a wide color reproduction area.

In the case where the two-dimensional image display device includes a two-dimensional space modulation element incorporated with a liquid crystal panel, degradation of a crystal material contained in the liquid crystal panel can be suppressed by using the laser light source device.

Yet another aspect of the invention is directed to a backlight light source comprising the aforementioned laser light source device, wherein the backlight light source is operative to illuminate a liquid crystal display portion by using the laser beams of 2 W or more in average output to be emitted from the laser light source device. The temperature of the liquid crystal display portion can be maintained by releasing, from the optical fiber, the energy of the remaining fundamental wave generated in the wavelength conversion module incorporated in the backlight light source having the above arrangement. This arrangement contributes to maintaining a high response speed of the liquid crystal display portion.

Yet another aspect of the invention is directed to a liquid crystal display device comprising the aforementioned backlight light source. The liquid crystal display device having the above arrangement enables to suppress degradation of a liquid crystal material contained in the liquid crystal panel.

Still another aspect of the invention is directed to a laser processing device comprising the aforementioned laser light source device, wherein the laser processing device is operative to process an object to be processed by using the laser beams of 2 W or more in average output to be emitted from the laser light source device. The laser processing device having the above arrangement is a laser drawing-processing device suitable for processing a copper containing member such as a printed circuit board.

INDUSTRIAL APPLICABILITY

The wavelength conversion module of the present invention wastes a remaining fundamental wave after wavelength conversion by utilizing an optical loss, which is an inherent characteristic of an optical fiber. Accordingly, the energy of the remaining fundamental wave can be dispersed and released. As a result, there is no need of providing a large-sized beam dumper or a heat-releasing fin. Also, since an optical fiber is used for light incidence and exit, the inventive wavelength conversion module can be easily connected to a fiber laser device by fusing and connecting fibers to each other. This arrangement is free of alignment displacement or a like drawback, which is advantageous in securing high reliability. Use of the inventive wavelength conversion module is advantageous in constructing a device incorporated with the wavelength conversion module in a simplified manner. It is possible to additionally connect the wavelength conversion module without complicated adjustment, and accordingly the number of parts can be reduced, thereby enabling to reduce the production cost.

In view of the above advantages, the present invention is useful in constructing a high-luminance laser display (image display device) with a more simplified arrangement.

The invention claimed is:

1. A wavelength conversion module, comprising:
a first fundamental wave propagation optical fiber for propagating a fundamental wave emitted from a laser light source;
a first wavelength conversion element, optically connected to the first fundamental wave propagation optical fiber, for converting the fundamental wave to be exited from the first fundamental wave propagation optical fiber into a harmonic wave; and a first harmonic propagation optical fiber, optically connected to the first wavelength conversion element, for propagating the harmonic wave exited from the first wavelength conversion element, wherein the first harmonic propagation optical fiber has a core diameter smaller than a core diameter of the first fundamental wave propagation optical fiber.

2. The wavelength conversion module according to claim 1, wherein the core diameter of the first harmonic propagation optical fiber is 0.9 times as large as the core diameter of the first fundamental wave propagation optical fiber, or less.

3. The wavelength conversion module according to claim 1, further comprising:

a beam splitter, provided between the first wavelength conversion element and the first harmonic propagation optical fiber, for separating the harmonic wave and a remaining fundamental wave to be emitted from the first wavelength conversion element.

4. The wavelength conversion module according to claim 3, further comprising:

a second fundamental wave propagation optical fiber for propagating the remaining fundamental wave separated by the beam splitter.

5. A wavelength conversion module unit, comprising:

a plurality of the wavelength conversion modules of claim 4 being optically connected to each other in a multi-stage manner, wherein the second fundamental wave propagation optical fiber in the wavelength conversion module of the n-th stage, and the first fundamental wave propagation optical fiber in the wavelength conversion module of the (n+1)-th stage are optically connected to each other, where n is an integer of 1 or more.

6. The wavelength conversion module according to claim 3, further comprising:

a second wavelength conversion element for converting a wavelength of the remaining fundamental wave separated by the beam splitter into a harmonic wave; and a second harmonic propagation optical fiber for propagating the harmonic wave to be emitted from the second wavelength conversion element.

7. The wavelength conversion module according to claim 1, wherein the first harmonic propagation optical fiber includes a curved portion having a predetermined curvature radius.

8. The wavelength conversion module according to claim 7, wherein the curvature radius of the curved portion is 60 mm or less.

9. The wavelength conversion module according to claim 1, wherein at least one of the first fundamental wave propagation optical fiber and the first harmonic propagation optical fiber is a polarized wave maintaining fiber.

10. The wavelength conversion module according to claim 1, wherein the first wavelength conversion element contains at least one kind of component selected from the group consisting of titanyl potassium phosphate, lithium niobate having a congruent composition, lithium niobate having a stoichiometric composition, lithium tantalite having a congruent composition, and lithium tantalate having a stoichiometric composition.

11. The wavelength conversion module according to claim 1, wherein the first wavelength conversion element contains at least one kind of component selected from the group consisting of magnesium oxide doped lithium niobate having a congruent composition and magnesium oxide doped lithium tantalate having a congruent composition, with a molar concentration of the magnesium oxide being in the range from 5.3 to 6.3 mol.

12. The wavelength conversion module according to claim 1, wherein the first wavelength conversion element is a nonlinear optical single crystal having a periodically reversed polarization structure.

13. The wavelength conversion module according to claim 1, wherein the laser light source is a Yb-doped fiber laser.

14. The wavelength conversion module according to claim 1, wherein the harmonic wave has a wavelength in the range from 520 to 550 nm.

15. The wavelength conversion module according to claim 1, wherein a temperature of the first wavelength conversion element is in the range from 20 to 60° C. at the time of wavelength conversion.

16. A laser light source device, comprising:

the wavelength conversion module of claim 1, wherein the wavelength conversion module is operative to output laser beams of 2 W or more in average output and 200 to 800 nm in wavelength range.

17. A two-dimensional image display device, comprising:

the laser light source device of claim 16, wherein the two-dimensional image display device is operative to display an image by using the laser beams of 2 W or more in average output to be emitted from the laser light source device.

18. The two-dimensional image display device according to claim 17, wherein the two-dimensional image display device includes a two-dimensional space modulation element incorporated with a liquid crystal panel.

19. A backlight light source, comprising:

the laser light source device of claim 16, wherein the backlight light source is operative to illuminate a liquid crystal display portion by using the laser beams of 2 W or more in average output to be emitted from the laser light source device.

20. A liquid crystal display device, comprising:

the backlight light source of claim 19.

21. A laser processing device, comprising:

the laser light source device of claim 16, wherein the laser processing device is operative to process an object to be processed by using the laser beams of 2 W or more in average output to be emitted from the laser light source device.

* * * * *

UNITED STATES PATENT AND TRADEMARK OFFICE
CERTIFICATE OF CORRECTION

PATENT NO. : 7,692,848 B2  Page 1 of 1
APPLICATION NO. : 12/090064
DATED : April 6, 2010
INVENTOR(S) : Furuya et al.

It is certified that error appears in the above-identified patent and that said Letters Patent is hereby corrected as shown below:

Title Page, item [86] PCT No. PCT/JP2006/320226 should read PCT/JP2006/320266

Signed and Sealed this

Fifth Day of October, 2010

David J. Kappos
*Director of the United States Patent and Trademark Office*